United States Patent
McDaniel et al.

(10) Patent No.: US 11,299,562 B2
(45) Date of Patent: Apr. 12, 2022

(54) METHODS FOR TERMINATING OLEFIN POLYMERIZATIONS

(71) Applicant: Chevron Phillips Chemical Company LP, The Woodlands, TX (US)

(72) Inventors: Max P. McDaniel, Bartlesville, OK (US); Qing Yang, Bartlesville, OK (US); Kathy S. Clear, Bartlesville, OK (US); Tony R. Crain, Niotaze, KS (US); Timothy O. Odi, Kingwood, TX (US)

(73) Assignee: Chevron Phillips Chemical Company LP, The Woodlands, TX (US)

( * ) Notice: Subject to any disclaimer, the term of this patent is extended or adjusted under 35 U.S.C. 154(b) by 30 days.

(21) Appl. No.: 16/801,314

(22) Filed: Feb. 26, 2020

(65) Prior Publication Data

US 2020/0190227 A1   Jun. 18, 2020

Related U.S. Application Data

(63) Continuation of application No. 16/271,935, filed on Feb. 11, 2019, now Pat. No. 10,676,545, which is a continuation of application No. 13/527,633, filed on Jun. 20, 2012, now Pat. No. 10,273,315.

(51) Int. Cl.
| | |
|---|---|
| C08F 2/38 | (2006.01) |
| C08F 2/40 | (2006.01) |
| C08F 2/42 | (2006.01) |
| C08F 4/659 | (2006.01) |
| C08F 4/6592 | (2006.01) |

(52) U.S. Cl.
CPC ............ *C08F 2/40* (2013.01); *C08F 2/38* (2013.01); *C08F 2/42* (2013.01); *C08F 4/65912* (2013.01); *C08F 4/65927* (2013.01); *C08F 2410/05* (2013.01)

(58) Field of Classification Search
CPC ............ C08F 2/38; C08F 2/40; C08F 2/42
See application file for complete search history.

(56) References Cited

U.S. PATENT DOCUMENTS

| | | | |
|---|---|---|---|
| 2,040,916 A * | 5/1936 | Bjerg | C08J 5/125 156/336 |
| 2,765,221 A * | 10/1956 | Lusebrink | C10L 1/143 44/320 |
| 2,825,721 A | 3/1958 | Hogan et al. | |
| 2,837,546 A * | 6/1958 | Nichols | C11C 3/00 554/27 |
| 3,119,569 A | 1/1964 | Baricordi | |
| 3,155,638 A * | 11/1964 | Iacoviello | C08L 2666/26 525/329.5 |
| 3,177,184 A | 4/1965 | Cottle | |
| 3,225,023 A | 12/1965 | Hogan et al. | |
| 3,226,205 A | 12/1965 | Rohlfing | |
| 3,242,099 A | 3/1966 | Manyik et al. | |
| 3,248,179 A | 4/1966 | Norwood | |
| 3,269,997 A | 8/1966 | Lyons et al. | |
| 3,325,408 A * | 6/1967 | Wayo | C10L 1/1817 508/457 |
| 3,622,521 A | 11/1971 | Hogan et al. | |
| 3,625,864 A | 12/1971 | Horvath | |
| 3,650,669 A * | 3/1972 | Osborn | C08F 2/46 8/115.52 |
| 3,708,465 A | 1/1973 | Dietrich et al. | |
| 3,849,580 A * | 11/1974 | Sejpal | A23C 15/14 426/116 |
| 3,887,494 A | 6/1975 | Dietz | |
| 3,900,457 A | 8/1975 | Witt | |
| 3,976,632 A | 8/1976 | Delap | |
| 4,053,436 A | 10/1977 | Hogan et al. | |
| 4,081,407 A | 3/1978 | Short et al. | |
| 4,151,122 A | 4/1979 | McDaniel et al. | |
| 4,182,815 A | 1/1980 | McDaniel et al. | |
| 4,211,863 A | 7/1980 | McDaniel et al. | |
| 4,247,421 A | 1/1981 | McDaniel et al. | |
| 4,248,735 A | 2/1981 | McDaniel et al. | |
| 4,296,001 A | 10/1981 | Hawley | |
| 4,297,460 A | 10/1981 | McDaniel et al. | |
| 4,301,034 A | 11/1981 | McDaniel | |
| 4,302,366 A * | 11/1981 | Perronin | D21H 19/20 252/8.57 |
| 4,306,044 A | 12/1981 | Charsley | |
| 4,326,048 A | 4/1982 | Stevens et al. | |
| 4,331,791 A | 5/1982 | Rohlfing et al. | |
| 4,339,559 A | 7/1982 | McDaniel | |

(Continued)

FOREIGN PATENT DOCUMENTS

| | | | |
|---|---|---|---|
| CA | 732279 A | 4/1966 | |
| EP | 0103120 A2 | 3/1984 | |
| WO | WO 2010/041141 A2 * | 4/2010 | ............... A61K 9/12 |

OTHER PUBLICATIONS

Bomgardner, entitled "Replacing Trans Fat", published Mar. 12, 2012 at www.cen-online.org, pp. 30-32.
Dow Corning 702 Diffusion Pump Fluid, Dow Corning 704 Diffusion Pump Fluid, and Dow Corning 705 Diffusion Pump Fluid, (1998), 4 pages.
Wikipedia disclosure for polyol, 4 pages.
Wikipedia disclosure for glycerol, 9 pages.
Wikipedia disclosure for corn oil, 3 pages.

(Continued)

*Primary Examiner* — Rip A Lee

(74) *Attorney, Agent, or Firm* — Merchant & Gould P.C.

(57) ABSTRACT

Catalyst deactivating agents and compositions containing catalyst deactivating agents are disclosed. These catalyst deactivating agents can be used in methods of controlling polymerization reactions, methods of terminating polymerization reactions, methods of operating polymerization reactors, and methods of transitioning between catalyst systems.

23 Claims, 3 Drawing Sheets

(56) References Cited

U.S. PATENT DOCUMENTS

| | | |
|---|---|---|
| 4,364,842 A | 12/1982 | McDaniel et al. |
| 4,364,854 A | 12/1982 | McDaniel et al. |
| 4,364,855 A | 12/1982 | McDaniel et al. |
| 4,392,990 A | 7/1983 | Witt |
| 4,397,766 A | 8/1983 | Hawley et al. |
| 4,397,769 A | 8/1983 | McDaniel et al. |
| 4,405,501 A | 9/1983 | Witt |
| 4,425,164 A * | 1/1984 | Bliznak .................. A21D 8/08 106/128.1 |
| 4,444,962 A | 4/1984 | McDaniel et al. |
| 4,444,964 A | 4/1984 | McDaniel et al. |
| 4,444,965 A | 4/1984 | McDaniel et al. |
| 4,449,415 A * | 5/1984 | Groenhof ........... C10M 171/002 476/7 |
| 4,460,756 A | 7/1984 | McDaniel et al. |
| 4,501,885 A | 2/1985 | Sherk et al. |
| 4,504,638 A | 3/1985 | McDaniel et al. |
| 4,547,555 A | 10/1985 | Cook et al. |
| 4,547,557 A | 10/1985 | McDaniel |
| 4,588,790 A | 5/1986 | Jenkins, III et al. |
| 4,634,744 A | 1/1987 | Hwang et al. |
| 4,666,999 A | 5/1987 | Cook et al. |
| 4,728,706 A | 3/1988 | Farnham et al. |
| 4,735,931 A | 4/1988 | McDaniel et al. |
| 4,786,717 A | 11/1988 | Bretches et al. |
| 4,806,513 A | 2/1989 | McDaniel et al. |
| 4,808,561 A | 2/1989 | Welborn, Jr. |
| 4,820,785 A | 4/1989 | McDaniel et al. |
| 4,834,947 A | 5/1989 | Cook et al. |
| 4,855,271 A | 8/1989 | McDaniel et al. |
| 4,939,217 A | 7/1990 | Stricklen |
| 4,981,831 A | 1/1991 | Knudsen et al. |
| 4,988,657 A | 1/1991 | Martin et al. |
| 5,026,885 A | 6/1991 | Bell et al. |
| 5,037,911 A | 8/1991 | McDaniel et al. |
| 5,093,415 A | 3/1992 | Brady, III et al. |
| 5,179,178 A | 1/1993 | Stacy et al. |
| 5,191,132 A | 3/1993 | Patsidis et al. |
| 5,210,352 A | 5/1993 | Alt et al. |
| 5,219,817 A | 6/1993 | McDaniel et al. |
| 5,221,654 A | 6/1993 | McDaniel et al. |
| 5,237,025 A | 8/1993 | Benham et al. |
| 5,244,990 A | 9/1993 | Mitchell |
| 5,270,408 A | 12/1993 | Craddock, III et al. |
| 5,275,992 A | 1/1994 | Mitchell et al. |
| 5,292,712 A * | 3/1994 | Klug .................... B41M 5/3335 427/150 |
| 5,331,086 A | 7/1994 | Stricklen et al. |
| 5,347,026 A | 9/1994 | Patsidis et al. |
| 5,352,749 A | 10/1994 | DeChellis et al. |
| 5,374,434 A * | 12/1994 | Clapp ...................... A21D 8/08 426/116 |
| 5,399,320 A | 3/1995 | Craddock, III et al. |
| 5,399,636 A | 3/1995 | Alt et al. |
| 5,401,817 A | 3/1995 | Palackal et al. |
| 5,420,320 A | 5/1995 | Zenk et al. |
| 5,436,304 A | 7/1995 | Griffin et al. |
| 5,436,305 A | 7/1995 | Alt et al. |
| 5,451,649 A | 9/1995 | Zenk et al. |
| 5,455,314 A | 10/1995 | Burns et al. |
| 5,480,848 A | 1/1996 | Geerts |
| 5,496,781 A | 3/1996 | Geerts et al. |
| 5,498,581 A | 3/1996 | Welch et al. |
| 5,541,272 A | 7/1996 | Schmid et al. |
| 5,543,479 A | 8/1996 | Baade et al. |
| 5,554,795 A | 9/1996 | Frey et al. |
| 5,563,284 A | 10/1996 | Frey et al. |
| 5,565,175 A | 10/1996 | Hottovy et al. |
| 5,565,592 A | 10/1996 | Patsidis et al. |
| 5,571,880 A | 11/1996 | Alt et al. |
| 5,575,979 A | 11/1996 | Hanson |
| 5,594,078 A | 1/1997 | Welch et al. |
| 5,610,247 A | 3/1997 | Alt et al. |
| 5,627,247 A | 5/1997 | Alt et al. |
| 5,631,203 A | 5/1997 | Welch et al. |
| 5,631,335 A | 5/1997 | Alt et al. |
| 5,654,454 A | 8/1997 | Peifer et al. |
| 5,668,230 A | 9/1997 | Schertl et al. |
| 5,705,579 A | 1/1998 | Hawley et al. |
| 5,804,169 A * | 9/1998 | Ramin .................... A61K 8/31 424/401 |
| 6,004,923 A * | 12/1999 | Oftring ................. C07C 229/16 510/470 |
| 6,121,210 A * | 9/2000 | Taylor .................. C10M 133/10 508/208 |
| 6,239,235 B1 | 5/2001 | Hottovy et al. |
| 6,262,191 B1 | 7/2001 | Hottovy et al. |
| 6,300,271 B1 | 10/2001 | McDaniel et al. |
| 6,355,594 B1 | 3/2002 | McDaniel et al. |
| 6,365,681 B1 | 4/2002 | Hartley et al. |
| 6,395,666 B1 | 5/2002 | McDaniel et al. |
| 6,403,735 B1 | 6/2002 | Becke et al. |
| 6,548,442 B1 | 4/2003 | McDaniel et al. |
| 6,559,247 B2 | 5/2003 | Kufeld et al. |
| 6,613,712 B1 | 9/2003 | McDaniel et al. |
| 6,653,416 B2 | 11/2003 | McDaniel et al. |
| 6,825,292 B2 | 11/2004 | Reid |
| 6,831,141 B2 | 12/2004 | McDaniel et al. |
| 6,833,338 B2 | 12/2004 | McDaniel et al. |
| 6,833,415 B2 | 12/2004 | Kendrick et al. |
| 6,838,531 B2 | 1/2005 | Reid et al. |
| 6,863,721 B2 * | 3/2005 | Grosskopf ............ A21C 15/005 106/31.6 |
| 7,005,485 B2 | 2/2006 | Burns et al. |
| 7,294,599 B2 | 11/2007 | Jensen et al. |
| 7,312,283 B2 | 12/2007 | Martin et al. |
| 7,381,777 B1 | 6/2008 | Towles et al. |
| 7,414,097 B2 | 8/2008 | Kuwahara et al. |
| 7,417,097 B2 | 8/2008 | Yu et al. |
| 7,446,167 B2 | 11/2008 | Blackmon et al. |
| 8,344,198 B2 | 1/2013 | Ewert et al. |
| 8,440,772 B2 | 5/2013 | Yang et al. |
| 8,598,283 B2 | 12/2013 | Markel et al. |
| 8,653,190 B2 * | 2/2014 | Chatterjee ............... C09J 183/08 525/103 |
| 8,940,844 B2 | 1/2015 | Yang et al. |
| 10,273,315 B2 | 4/2019 | McDaniel et al. |
| 2002/0098308 A1 | 7/2002 | Cesare et al. |
| 2003/0236552 A1 | 12/2003 | Roby |
| 2004/0091419 A1 | 5/2004 | Ogihara et al. |
| 2004/0151642 A1 | 8/2004 | Burns et al. |
| 2004/0230031 A1 | 11/2004 | Hottovy et al. |
| 2004/0253151 A1 | 12/2004 | Nguyen et al. |
| 2007/0135536 A1* | 6/2007 | Mohanty ............ C08G 18/0895 524/47 |
| 2012/0277385 A1 | 11/2012 | Yang et al. |
| 2013/0228723 A1 | 9/2013 | Yang et al. |
| 2017/0165163 A1* | 6/2017 | Glenn, Jr. ............. A61K 8/4973 |

OTHER PUBLICATIONS

Wikipedia disclosure for silicone oil, 2 pages.
IUPAC Compendium of Chemical Technology, 2nd Edition, 1997.

* cited by examiner

METHODS FOR TERMINATING OLEFIN POLYMERIZATIONS

REFERENCE TO RELATED APPLICATIONS

This application is a continuation application of U.S. patent application Ser. No. 16/271,935, filed on Feb. 11, 2019, now U.S. Pat. No. 10,676,545, which is a continuation application of U.S. patent application Ser. No. 13/527,633, filed on Jun. 20, 2012, now U.S. Pat. No. 10,273,315, the disclosures of which are incorporated herein by reference in their entirety.

BACKGROUND OF THE INVENTION

There are various methods and materials that can be employed to terminate a polymerization reaction. For example, injections of large amounts of water or isopropanol into a polymerization reactor or downstream of the reactor can be used to terminate the polymerization reaction. However, these methods and materials often can lead to excessive cost, clean-up, and/or downtime.

It would be beneficial to develop new methods and materials that can effectively terminate a polymerization reaction, either for rapid termination in the polymerization reactor due to a process upset, or for neutralization of catalyst reactivity downstream of the reactor during normal polymer production, yet reduce the associated cost, clean-up, and downtime. Accordingly, it is to these ends that the present disclosure is directed.

SUMMARY OF THE INVENTION

Methods of controlling a polymerization reaction in a polymerization reactor system are disclosed herein. One such method can comprise introducing a catalyst deactivating agent into the polymerization reactor system to partially or completely terminate the polymerization reaction. The catalyst deactivating agent can be introduced into a polymerization reactor within the polymerization reactor system, and/or the catalyst deactivating agent can be introduced downstream of the polymerization reactor. Consistent with embodiments disclosed herein, the catalyst deactivating agent can comprise a natural source oil, a siloxane, or a combination thereof.

Another method of controlling a polymerization reaction in a polymerization reactor system is provided, and in this embodiment, the method can comprise:
(i) introducing a transition metal-based catalyst system, an olefin monomer, and optionally an olefin comonomer into a polymerization reactor within the polymerization reactor system;
(ii) contacting the transition metal-based catalyst system with the olefin monomer and the optional olefin comonomer under polymerization conditions to produce an olefin polymer; and
(iii) introducing a catalyst deactivating agent into the polymerization reactor to partially or completely terminate the polymerization reaction in the polymerization reactor.

Another method of controlling a polymerization reaction in a polymerization reactor system is provided, and in this embodiment, the method can comprise:
(1) introducing a transition metal-based catalyst system, an olefin monomer, and optionally an olefin comonomer into a polymerization reactor within the polymerization reactor system;
(2) contacting the transition metal-based catalyst system with the olefin monomer and the optional olefin comonomer under polymerization conditions to produce an olefin polymer; and
(3) introducing a catalyst deactivating agent into the polymerization reactor system downstream of the polymerization reactor to completely terminate the polymerization reaction.

Another method of controlling a polymerization reaction in a polymerization reactor system is provided herein, and this method can comprise:
(a) introducing a transition metal-based catalyst system, an olefin monomer, and optionally an olefin comonomer into a polymerization reactor within the polymerization reactor system;
(b) contacting the transition metal-based catalyst system with the olefin monomer and the optional olefin comonomer under polymerization conditions to produce an olefin polymer;
(c) monitoring a process variable to detect an undesired condition in the polymerization reactor system; and
(d) when the undesired reaction condition has reached a predetermined critical level, introducing a catalyst deactivating agent into the polymerization reactor.

Yet, in another embodiment, a method of controlling a polymerization reaction in a polymerization reactor system directed to transitioning between catalyst systems is provided. This method can comprise:
(A) introducing a first transition metal-based catalyst system, a first olefin monomer, and optionally a first olefin comonomer into a polymerization reactor in the polymerization reactor system;
(B) contacting the first transition metal-based catalyst system with the first olefin monomer and the optional first olefin comonomer under polymerization conditions to produce a first olefin polymer;
(C) discontinuing the introducing of the first transition metal-based catalyst system into the polymerization reactor before, during, or after a step of introducing a catalyst deactivating agent into the polymerization reactor; and
(D) introducing a second transition metal-based catalyst system into the polymerization reactor and contacting the second transition metal-based catalyst system with a second olefin monomer and optionally a second olefin comonomer under polymerization conditions to produce a second olefin polymer.

DEFINITIONS

Figure 1:
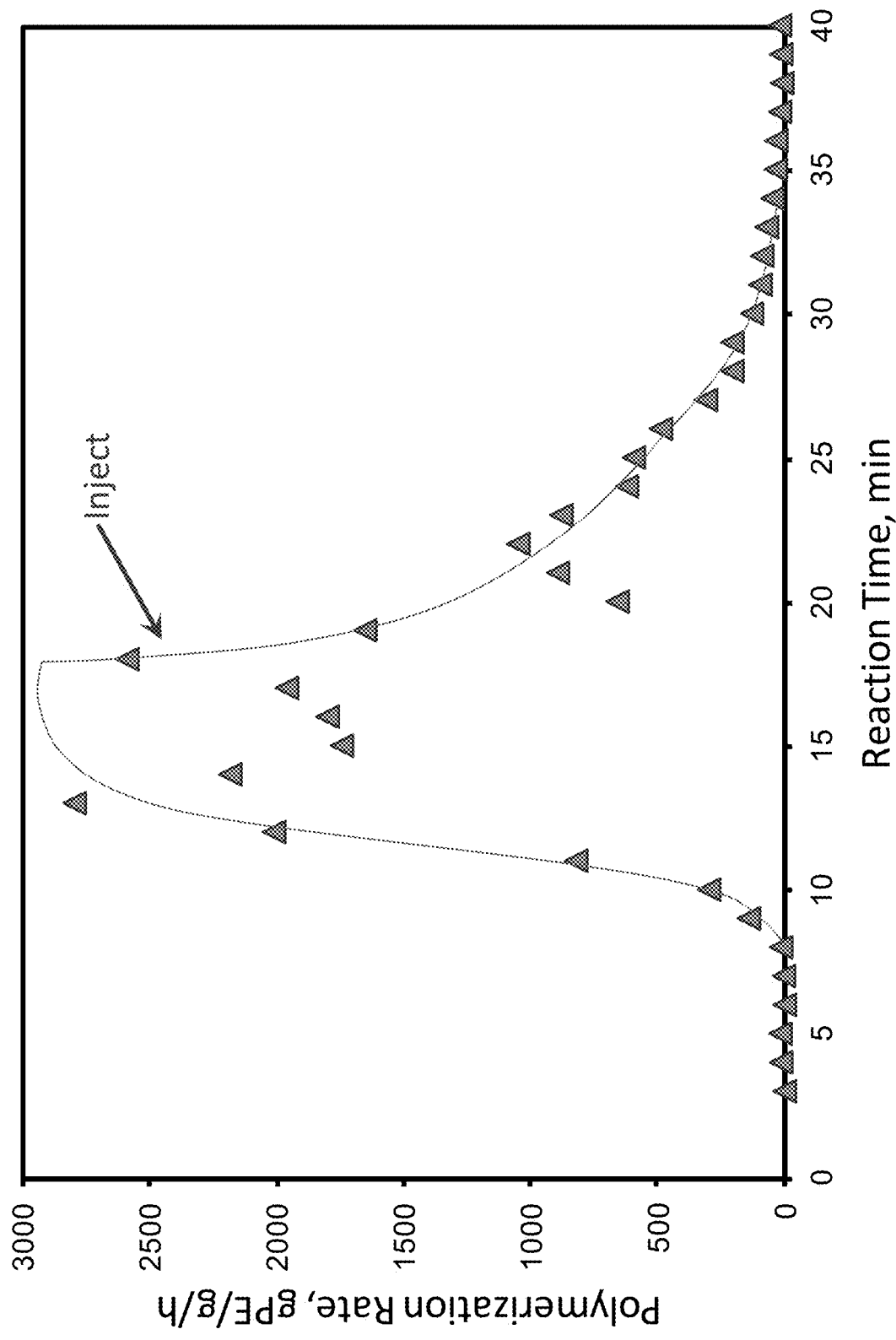
FIG. 1 presents a plot of the reaction rate versus the reaction time for Example 1 and the addition of corn oil to a polymerization reaction using a chromium-based catalyst system.

To define more clearly the terms used herein, the following definitions are provided. Unless otherwise indicated, the following definitions are applicable to this disclosure. If a term is used in this disclosure but is not specifically defined herein, the definition from the IUPAC Compendium of Chemical Terminology, 2$^{nd}$ Ed (1997) can be applied, as long as that definition does not conflict with any other disclosure or definition applied herein, or render indefinite or non-enabled any claim to which that definition is applied. To the extent that any definition or usage provided by any document incorporated herein by reference conflicts with the definition or usage provided herein, the definition or usage provided herein controls.

Regarding claim transitional terms or phrases, the transitional term "comprising," which is synonymous with "including," "containing," "having," or "characterized by," is inclusive or open-ended and does not exclude additional, unrecited elements or method steps. The transitional phrase "consisting of" excludes any element, step, or ingredient not specified in the claim. The transitional phrase "consisting essentially of" limits the scope of a claim to the specified materials or steps and those that do not materially affect the basic and novel characteristic(s) of the claim. A "consisting essentially of" claim occupies a middle ground between closed claims that are written in a "consisting of" format and fully open claims that are drafted in a "comprising" format. Absent an indication to the contrary, describing a compound or composition as "consisting essentially of" is not to be construed as "comprising," but is intended to describe the recited component that includes materials which do not significantly alter the composition or method to which the term is applied. For example, a feedstock consisting essentially of a material A can include impurities typically present in a commercially produced or commercially available sample of the recited compound or composition. When a claim includes different features and/or feature classes (for example, a method step, feedstock features, and/or product features, among other possibilities), the transitional terms comprising, consisting essentially of, and consisting of apply only to the feature class to which it is utilized, and it is possible to have different transitional terms or phrases utilized with different features within a claim. For example, a method can comprise several recited steps (and other non-recited steps), but utilize a system preparation consisting of specific components; alternatively, consisting essentially of specific components; or alternatively, comprising the specific components and other non-recited components.

While compositions and methods are often described in terms of "comprising" various components or steps, the compositions and methods can also "consist essentially of" or "consist of" the various components or steps, unless stated otherwise.

The terms "a," "an," and "the" are intended to include plural alternatives, e.g., at least one. For instance, the disclosure of "a catalyst deactivating agent," "an olefin comonomer," etc., is meant to encompass one, or mixtures or combinations of more than one, catalyst deactivating agent, olefin comonomer, etc., unless otherwise specified.

For any particular compound or group disclosed herein, any name or structure (general or specific) presented is intended to encompass all conformational isomers, regioisomers, stereoisomers, and mixtures thereof that can arise from a particular set of substituents, unless otherwise specified. The name or structure (general or specific) also encompasses all enantiomers, diastereomers, and other optical isomers (if there are any) whether in enantiomeric or racemic forms, as well as mixtures of stereoisomers, as would be recognized by a skilled artisan, unless otherwise specified. A general reference to pentane, for example, includes n-pentane, 2-methyl-butane, and 2,2-dimethylpropane; and a general reference to a butyl group includes a n-butyl group, a sec-butyl group, an iso-butyl group, and a t-butyl group.

Within this disclosure, the normal rules of organic nomenclature will prevail. For instance, when referencing substituted compounds or groups, references to substitution patterns are taken to indicate that the indicated group(s) is(are) located at the indicated position and that all other non-indicated positions are hydrogen. For example, reference to a 4-substituted phenyl group indicates that there is a non-hydrogen substituent located at the 4 position and hydrogens located at the 2, 3, 5, and 6 positions. By way of another example, reference to a 3-substituted naphth-2-yl indicates that there is a non-hydrogen substituent located at the 3 position and hydrogens located at the 1, 4, 5, 6, 7, and 8 positions. References to compounds or groups having substitutions at positions in addition to the indicated position will be referenced using comprising or some other alternative language. For example, a reference to a phenyl group comprising a substituent at the 4 position refers to a phenyl group having a substituent at the 4 position and hydrogen or any non-hydrogen substituent at the 2, 3, 5, and 6 positions.

In one embodiment, a chemical "group" can be defined or described according to how that group is formally derived from a reference or "parent" compound, for example, by the number of hydrogen atoms removed from the parent compound to generate the group, even if that group is not literally synthesized in such a manner. These groups can be utilized as substituents or coordinated or bonded to metal atoms. By way of example, an "alkyl group" formally can be derived by removing one hydrogen atom from an alkane, while an "alkylene group" formally can be derived by removing two hydrogen atoms from an alkane. Moreover, a more general term can be used to encompass a variety of groups that formally are derived by removing any number ("one or more") hydrogen atoms from a parent compound, which in this example can be described as an "alkane group," and which encompasses an "alkyl group," an "alkylene group," and materials having three or more hydrogen atoms, as necessary for the situation, removed from an alkane. The disclosure that a substituent, ligand, or other chemical moiety can constitute a particular "group" implies that the well-known rules of chemical structure and bonding are followed when that group is employed as described. When describing a group as being "derived by," "derived from," "formed by," or "formed from," such terms are used in a formal sense and are not intended to reflect any specific synthetic methods or procedures, unless specified otherwise or the context requires otherwise.

Also, unless otherwise specified, any carbon-containing group for which the number of carbon atoms is not specified can have, according to proper chemical practice, 1, 2, 3, 4, 5, 6, 7, 8, 9, 10, 11, 12, 13, 14, 15, 16, 17, or 18 carbon atoms, or any range or combination of ranges between these values. For example, unless otherwise specified, any carbon-containing group can have from 1 to 18 carbon atoms, from 1 to 15 carbon atoms, from 1 to 12 carbon atoms, from 1 to 10 carbon atoms, from 1 to 8 carbon atoms, or from 1 to 5 carbon atoms, and the like. Moreover, other identifiers or qualifying terms can be utilized to indicate the presence of, or absence of, a particular substituent, a particular regiochemistry, and/or stereochemistry, or the presence of absence of a branched underlying structure or backbone. Any specific carbon-containing group is limited according to the chemical and structural requirements for that specific group, as understood by one of ordinary skill. For example, unless otherwise specified, an aryl group can have from 6 to 18 carbon atoms, from 6 to 15 carbon atoms, from 6 to 12 carbon atoms, or from 6 to 10 carbon atoms, and the like. Thus, according to proper chemical practice and unless otherwise specified, an aryl group can have 6, 7, 8, 9, 10, 11, 12, 13, 14, 15, 16, 17, or 18 carbon atoms, or any range or combination of ranges between these values.

Other numerical ranges are disclosed herein. When Applicants disclose or claim a range of any type, Applicants' intent is to disclose or claim individually each possible number that such a range could reasonably encompass, including end points of the range as well as any sub-ranges and combinations of sub-ranges encompassed therein, unless otherwise specified. As a representative example, Applicants disclose that a weight ratio of a catalyst deactivating agent to a transition metal in a transition metal-based catalyst system can be in a range from 1:1 to 25:1 in certain embodiments. By a disclosure that the weight ratio of the catalyst deactivating agent to the transition metal in the transition metal-based catalyst system can be in a range from 1:1 to 25:1, Applicants intend to recite that the weight ratio can be equal to 1:1, about 2:1, about 3:1, about 4:1, about 5:1, about 6:1, about 7:1, about 8:1, about 9:1, about 10:1, about 11:1, about 12:1, about 13:1, about 14:1, about 15:1, about 16:1, about 17:1, about 18:1, about 19:1, about 20:1, about 21:1, about 22:1, about 23:1, about 24:1, or 25:1. Additionally, the weight ratio can be within any range from 1:1 to 25:1 (for example, the weight ratio can be in a range from about 2:1 to about 10:1), and this also includes any combination of ranges between 1:1 and 25:1. Likewise, all other ranges disclosed herein should be interpreted in a manner similar to these examples.

Applicants reserve the right to proviso out or exclude any individual members of any such group, including any sub-ranges or combinations of sub-ranges within the group, that can be claimed according to a range or in any similar manner, if for any reason Applicants choose to claim less than the full measure of the disclosure, for example, to account for a reference that Applicants can be unaware of at the time of the filing of the application. Further, Applicants reserve the right to proviso out or exclude any individual substituents, analogs, compounds, ligands, structures, or groups thereof, or any members of a claimed group, if for any reason Applicants choose to claim less than the full measure of the disclosure, for example, to account for a reference that Applicants can be unaware of at the time of the filing of the application.

The term "substituted" when used to describe a group or a chain of carbon atoms, for example, when referring to a substituted analog of a particular group or chain, is intended to describe or group or chain wherein any non-hydrogen moiety formally replaces a hydrogen in that group or chain, and is intended to be non-limiting. A group or chain also can be referred to herein as "unsubstituted" or by equivalent terms such as "non-substituted," which refers to the original group or chain. "Substituted" is intended to be non-limiting and can include hydrocarbon substituents as specified and as understood by one of ordinary skill in the art.

The term "hydrocarbon" whenever used in this specification and claims refers to a compound containing only carbon and hydrogen. Other identifiers can be utilized to indicate the presence of particular groups in the hydrocarbon (e.g., halogenated hydrocarbon indicates the presence of one or more halogen atoms replacing an equivalent number of hydrogen atoms in the hydrocarbon). The term "hydrocarbyl group" is used herein in accordance with the definition specified by IUPAC: a univalent group formed by removing a hydrogen atom from a hydrocarbon (that is, a group containing only carbon and hydrogen). Similarly, a "hydrocarbylene group" refers to a group formed by removing two hydrogen atoms from a hydrocarbon, either two hydrogen atoms from one carbon atom or one hydrogen atom from each of two different carbon atoms. Therefore, in accordance with the terminology used herein, a "hydrocarbon group" refers to a generalized group formed by removing one or more hydrogen atoms (as needed for the particular group) from a hydrocarbon. A "hydrocarbyl group," "hydrocarbylene group," and "hydrocarbon group" can be acyclic or cyclic groups, and/or can be linear or branched. A "hydrocarbyl group," "hydrocarbylene group," and "hydrocarbon group" can include rings, ring systems, aromatic rings, and aromatic ring systems, which contain only carbon and hydrogen. "Hydrocarbyl groups," "hydrocarbylene groups," and "hydrocarbon groups" include, by way of example, aryl, arylene, arene groups, alkyl, alkylene, alkane groups, cycloalkyl, cycloalkylene, cycloalkane groups, aralkyl, aralkylene, and aralkane groups, respectively, among other groups as members.

An aliphatic compound is a non-aromatic organic compound. An "aliphatic group" is a generalized group formed by removing one or more hydrogen atoms (as needed for the particular group) from the carbon atoms of an aliphatic compound. An aliphatic compound can be acyclic or cyclic, saturated or unsaturated, and/or linear or branched organic compound. Aliphatic compounds and aliphatic groups can contain organic functional group(s) and/or atom(s) other than carbon and hydrogen unless otherwise specified (e.g., an aliphatic hydrocarbon).

The term "alkane" whenever used in this specification and claims refers to a saturated hydrocarbon compound. Other identifiers can be utilized to indicate the presence of particular groups in the alkane (e.g., halogenated alkane indicates the presence of one or more halogen atoms replacing an equivalent number of hydrogen atoms in the alkane). The term "alkyl group" is used herein in accordance with the definition specified by IUPAC: a univalent group formed by removing a hydrogen atom from an alkane. An "alkane group" is a general term that refers to a group formed by removing one or more hydrogen atoms (as needed for the particular group) from an alkane. An "alkyl group" and "alkane group" can be linear or branched unless otherwise specified. Primary, secondary, and tertiary alkyl groups can be derived by removal of a hydrogen atom from a primary, secondary, and tertiary carbon atom, respectively, of an alkane. The n-alkyl group can be derived by removal of a hydrogen atom from a terminal carbon atom of a linear alkane. The groups $RCH_2$ (R≠H), $R_2CH$ (R≠H), and $R_3C$ (R≠H) are primary, secondary, and tertiary alkyl groups, respectively. The carbon atom by which indicated moiety is attached is a secondary, tertiary, and quaternary carbon atom, respectively.

A cycloalkane is a saturated cyclic hydrocarbon, with or without side chains (e.g., cyclobutane or methylcyclobutane). Unsaturated cyclic hydrocarbons having at least one non-aromatic endocyclic carbon-carbon double or one triple bond are cycloalkenes and cycloalkynes, respectively. Unsaturated cyclic hydrocarbons having more than one such multiple bond can further specify the number and/or position(s) of such multiple bonds (e.g., cycloalkadienes, cycloalkatrienes, and so forth). The unsaturated cyclic hydrocarbons can be further identified by the position of the carbon-carbon multiple bond(s).

A "cycloalkyl group" is a univalent group derived by removing a hydrogen atom from a ring carbon atom from a cycloalkane. For example, a 1-methylcyclopropyl group and a 2-methylcyclopropyl group are illustrated as follows:

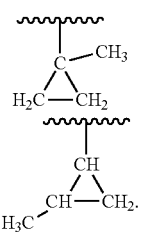

A "cycloalkylene group" refers to a group derived by removing two hydrogen atoms from a cycloalkane, at least one of which is a ring carbon. Thus, a "cycloalkylene group" includes a group derived from a cycloalkane in which two hydrogen atoms are formally removed from the same ring carbon, a group derived from a cycloalkane in which two hydrogen atoms are formally removed from two different ring carbons, and a group derived from a cycloalkane in which a first hydrogen atom is formally removed from a ring carbon and a second hydrogen atom is formally removed from a carbon atom that is not a ring carbon. A "cycloalkane group" refers to a generalized group formed by removing one or more hydrogen atoms (as necessary for the particular group and at least one of which is a ring carbon) from a cycloalkane.

The term "alkene" whenever used in this specification and claims refers to a compound that has at least one non-aromatic carbon-carbon double bond. The term "alkene" includes aliphatic or aromatic, cyclic or acyclic, and/or linear and branched alkenes unless expressly stated otherwise. Alkenes can also be further identified by the position of the carbon-carbon double bond. Alkenes having more than one such multiple bond are alkadienes, alkatrienes, and so forth. The alkene can be further identified by the position(s) of the carbon-carbon double bond(s).

An "alkenyl group" is a univalent group derived from an alkene by removal of a hydrogen atom from any carbon atom of the alkene. Thus, "alkenyl group" includes groups in which the hydrogen atom is formally removed from an $sp^2$ hybridized (olefinic) carbon atom and groups in which the hydrogen atom is formally removed from any other carbon atom. For example and unless otherwise specified, propen-1-yl (—CH=CHCH$_3$), propen-2-yl [(CH$_3$)C=CH$_2$], and propen-3-yl (—CH$_2$CH=CH$_2$) groups are all encompassed with the term "alkenyl group." Similarly, an "alkenylene group" refers to a group formed by formally removing two hydrogen atoms from an alkene, either two hydrogen atoms from one carbon atom or one hydrogen atom from two different carbon atoms. An "alkene group" refers to a generalized group formed by removing one or more hydrogen atoms (as needed for the particular group) from an alkene. When the hydrogen atom is removed from a carbon atom participating in a carbon-carbon double bond, the regiochemistry of the carbon from which the hydrogen atom is removed, and regiochemistry of the carbon-carbon double bond can both be specified. Alkenyl groups can also have more than one such multiple bond. The alkene group can also be further identified by the position(s) of the carbon-carbon double bond(s).

The term "alkyne" is used in this specification and claims to refer to a compound that has at least one carbon-carbon triple bond. The term "alkyne" includes aliphatic or aromatic, cyclic or acyclic, and/or linear and branched alkynes unless expressly stated otherwise. Alkynes having more than one such multiple bond are alkadiynes, alkatriynes, and so forth. The alkyne group can also be further identified by the position(s) of the carbon-carbon triple bond(s).

An "alkynyl group" is a univalent group derived from an alkyne by removal of a hydrogen atom from any carbon atom of the alkyne. Thus, "alkynyl group" includes groups in which the hydrogen atom is formally removed from an sp hybridized (acetylenic) carbon atom and groups in which the hydrogen atom is formally removed from any other carbon atom. For example and unless otherwise specified, 1-propyn-1-yl (—C≡CCH$_3$) and propyn-3-yl (HC≡CCH$_2$—) groups are encompassed with the term "alkynyl group." Similarly, an "alkynylene group" refers to a group formed by formally removing two hydrogen atoms from an alkyne, either two hydrogen atoms from one carbon atom if possible or one hydrogen atom from two different carbon atoms. An "alkyne group" refers to a generalized group formed by removing one or more hydrogen atoms (as needed for the particular group) from an alkyne. Alkyne groups can have more than one such multiple bond. Alkyne groups can also be further identified by the position(s) of the carbon-carbon triple bond(s).

An "aromatic group" refers to a generalized group formed by removing one or more hydrogen atoms (as needed for the particular group and at least one of which is an aromatic ring carbon atom) from an aromatic compound. Thus, an "aromatic group" as used herein refers to a group derived by removing one or more hydrogen atoms from an aromatic compound, that is, a compound containing a cyclically conjugated hydrocarbon that follows the Hückel (4n+2) rule and containing (4n+2) pi-electrons, where n is an integer from 1 to about 5. Aromatic compounds and hence "aromatic groups" can be monocyclic or polycyclic unless otherwise specified. Aromatic compounds include "arenes" (hydrocarbon aromatic compounds), examples of which can include, but are not limited to, benzene, naphthalene, and toluene, among others. As disclosed herein, the term "substituted" can be used to describe an aromatic group wherein any non-hydrogen moiety formally replaces a hydrogen in that group, and is intended to be non-limiting.

An "aryl group" refers to a generalized group formed by removing a hydrogen atom from an aromatic hydrocarbon ring carbon atom from an arene. One example of an "aryl group" is ortho-tolyl (o-tolyl), the structure of which is shown here.

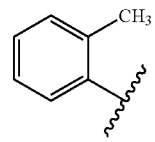 [SMILES: *c1ccccc1C]

Similarly, an "arylene group" refers to a group formed by removing two hydrogen atoms (at least one of which is from an aromatic hydrocarbon ring carbon) from an arene. An "arene group" refers to a generalized group formed by removing one or more hydrogen atoms (as needed for the particular group and at least one of which is an aromatic hydrocarbon ring carbon) from an arene.

An "aralkyl group" is an aryl-substituted alkyl group having a free valance at a non-aromatic carbon atom, for example, a benzyl group is an "aralkyl" group. Similarly, an "aralkylene group" is an aryl-substituted alkylene group having two free valances at a single non-aromatic carbon atom or a free valence at two non-aromatic carbon atoms while an "aralkane group" is a generalized is an aryl-substituted alkane group having one or more free valances at a non-aromatic carbon atom(s).

The term "polymer" is used herein generically to include olefin homopolymers, copolymers, terpolymers, and so forth. A copolymer can be derived from an olefin monomer and one olefin comonomer, while a terpolymer can be derived from an olefin monomer and two olefin comonomers. Accordingly, "polymer" encompasses copolymers, terpolymers, etc., derived from any olefin monomer and comonomer(s) disclosed herein. Similarly, an ethylene polymer would include ethylene homopolymers, ethylene copolymers, ethylene terpolymers, and the like. As an example, an olefin copolymer, such as an ethylene copolymer, can be derived from ethylene and a comonomer, such as 1-butene, 1-hexene, or 1-octene. If the monomer and comonomer were ethylene and 1-hexene, respectively, the resulting polymer could be categorized an as ethylene/1-hexene copolymer. The term "polymer" also is meant to include all molecular weight polymers, and is inclusive of lower molecular weight polymers or oligomers. Applicants intend for the term "polymer" to encompass oligomers derived from any olefin monomer disclosed herein (as well from an olefin monomer and one olefin comonomer, an olefin monomer and two olefin comonomers, and so forth).

In like manner, the scope of the term "polymerization" includes homopolymerization, copolymerization, terpolymerization, etc., as well as processes that might also be referred to as oligomerization processes. Therefore, a copolymerization process would involve contacting an olefin monomer (e.g., ethylene) and an olefin comonomer (e.g., 1-hexene) to produce an olefin copolymer.

The terms "contact product," "contacting," and the like, are used herein to describe compositions wherein the components are contacted together in any order, in any manner, and for any length of time. For example, the components can be contacted by blending or mixing. Further, unless otherwise specified, the contacting of any component can occur in the presence or absence of any other component of the compositions described herein. Combining additional materials or components can be done by any suitable method. Further, the term "contact product" includes mixtures, blends, solutions, slurries, reaction products, and the like, or combinations thereof. Although "contact product" can, and often does, include reaction products, it is not required for the respective components to react with one another. Likewise, "contacting" two or more components can result in a reaction product or a reaction mixture. Consequently, depending upon the circumstances, a "contact product" can be a mixture, a reaction mixture, or a reaction product.

A "natural source oil" refers to an oil extracted, and optionally purified, from a naturally occurring fruit, nut, vegetable, plant, and/or animal source. Representative and non-limiting examples of "natural source oils" include soybean oil and corn oil. "Natural source oil" also is meant to be inclusive of the respective oils extracted, and optionally purified, from genetically modified fruit, nut, vegetable, plant, and/or animal sources, as well as enhanced derivatives or versions thereof. For instance, higher oleic acid versions of soybean, canola, and sunflower oils would still be considered soybean, canola, and sunflowers oils, respectively, within this disclosure and, therefore, are considered "natural source oils." Often, these natural source oils may be referred to in the art as vegetable oils, cooking oils, edible oils, and the like.

Although any methods and materials similar or equivalent to those described herein can be used in the practice or testing of the invention, the typical methods and materials are herein described.

All publications and patents mentioned herein are incorporated herein by reference for the purpose of describing and disclosing, for example, the constructs and methodologies that are described in the publications, which might be used in connection with the presently described invention. The publications discussed throughout the text are provided solely for their disclosure prior to the filing date of the present application. Nothing herein is to be construed as an admission that the inventors are not entitled to antedate such disclosure by virtue of prior invention.

DETAILED DESCRIPTION OF THE INVENTION

Disclosed herein are catalyst deactivating agents and methods for controlling a polymerization reaction in a polymerization reactor system using these catalyst deactivating agents. Compositions containing a catalyst deactivating agent also are provided.

Methods Utilizing a Catalyst Deactivating Agent

Methods of controlling a polymerization reaction in a polymerization reactor system are disclosed. In an embodiment, a method of controlling a polymerization reaction in a polymerization reactor system can be directed to partially or completely terminating the polymerization reaction in a polymerization reactor within the polymerization reactor system, and/or to completely terminating the polymerization reaction downstream of the polymerization reactor. In such instances, the polymerization reaction can comprise contacting a transition metal-based catalyst system with an olefin monomer and optionally an olefin comonomer in the polymerization reactor under polymerization conditions to produce an olefin polymer. The method of controlling the polymerization reaction (e.g., a method of terminating the polymerization reaction) can comprise introducing a catalyst deactivating agent into the polymerization reactor and/or downstream of the polymerization reactor.

Generally, the features of the methods disclosed herein (e.g., the transition metal-based catalyst system, the olefin monomer, the catalyst deactivating agent, the polymerization reactor, among others) are independently described herein, and these features can be combined in any combination to further describe the disclosed methods.

One method of controlling a polymerization reaction in a polymerization reactor system consistent with embodiments disclosed herein can comprise:

(i) introducing a transition metal-based catalyst system, an olefin monomer, and optionally an olefin comonomer into a polymerization reactor within the polymerization reactor system;

(ii) contacting the transition metal-based catalyst system with the olefin monomer and the optional olefin comonomer under polymerization conditions to produce an olefin polymer; and (iii) introducing a catalyst deactivating agent into the polymerization reactor to partially or completely terminate the polymerization reaction in the polymerization reactor.

The catalyst deactivating agent can be introduced (e.g., added, injected, sprayed, etc.) into the polymerization reactor by any suitable means, either alone or with a carrier (e.g., a carrier gas, a carrier liquid, etc.). The polymerization reaction occurring within the polymerization reactor system may be terminated for any of a number of reasons. Illustrative examples can include, but are not limited to, an excessive reactor temperature, a rapid increase in reactor temperature, an excessive reactor pressure, a rapid increase in reactor pressure, a loss of reactor coolant, a loss of gas flow in a fluidized bed reactor, an electrical failure in the reactor system, a mechanical failure in the reactor system, and an interruption in the operation of a piece of equipment downstream of the reactor, among others. Additionally, and depending upon the circumstances surrounding the reason for terminating the polymerization reaction, the termination of the polymerization reaction can be accomplished either in a controlled manner or under rapid/emergency conditions. Additionally, and depending upon the circumstances, it may be beneficial to partially terminate the polymerization reaction (e.g., maintain some catalyst activity and/or some polymer production rate), instead of completely terminating the polymerization reaction.

Another method of controlling a polymerization reaction in a polymerization reactor system consistent with embodiments disclosed herein can comprise:
(1) introducing a transition metal-based catalyst system, an olefin monomer, and optionally an olefin comonomer into a polymerization reactor within the polymerization reactor system;
(2) contacting the transition metal-based catalyst system with the olefin monomer and the optional olefin comonomer under polymerization conditions to produce an olefin polymer; and
(3) introducing a catalyst deactivating agent into the polymerization reactor system downstream of the polymerization reactor to completely terminate the polymerization reaction.

The catalyst deactivating agent can be introduced (e.g., added, injected, sprayed, etc.) downstream of the polymerization reactor by any suitable means, either alone or with a carrier (e.g., a carrier gas, a carrier liquid, etc.). Typically, the polymerization reaction can be terminated in an outlet pipe, in a discharge pipe, etc., or in another means of conveyance, from the polymerization reactor. Often, the catalyst deactivating agent can be added prior to a separations device or apparatus. The addition of a catalyst deactivating agent downstream of the reactor can neutralize any remaining active catalyst in the olefin polymer, and prevent any further reaction with olefin monomer and/or comonomer. Moreover, the addition of the catalyst deactivating agent downstream of the reactor can be substantially continuous and optionally at a fixed ratio based upon the polymer production or output rate. Using the disclosed catalyst deactivating agents to terminate the polymerization reaction and neutralize residual catalyst at this stage in the polymerization reactor system can, for instance, reduce skin formation in downstream equipment, prevent interactions with additives such as antioxidants, and reduce off-color formation in the polymer. In addition, certain catalyst deactivating agents disclosed herein can remain with the olefin polymer, if desired, and do not have to be evaporated/separated from the polymer, recycled, dried, etc. For instance, in certain embodiments, the catalyst deactivating agent beneficially can be non-toxic and/or can be permissible for use in food packaging applications. Moreover, it is also contemplated that the presence of certain disclosed catalyst deactivating agents in the final polymer may improve the frictional or slip properties of the polymer produced.

Yet another method of controlling a polymerization reaction in a polymerization reactor system consistent with embodiments disclosed herein can comprise:
(a) introducing a transition metal-based catalyst system, an olefin monomer, and optionally an olefin comonomer into a polymerization reactor within the polymerization reactor system;
(b) contacting the transition metal-based catalyst system with the olefin monomer and the optional olefin comonomer under polymerization conditions to produce an olefin polymer;
(c) monitoring a process variable to detect an undesired condition in the polymerization reactor system; and
(d) when the undesired reaction condition has reached a predetermined critical level, introducing a catalyst deactivating agent into the polymerization reactor.

Many process variables can be monitored during the operation of a polymerization reactor in a polymerization reactor system. These can include, but are not limited to, reactor temperature, reactor pressure, catalyst system flow rate into the reactor, monomer flow rate (and comonomer, if employed) into the reactor, olefin polymer output rate, recycle rate, hydrogen flow rate (if employed), reactor cooling status, circulation pump power, and the like. Process variables can be monitored to detect an undesired condition in the polymerization reactor system. As a non-limiting example, the reactor temperature can be monitored to ensure that the temperature within the reactor does not increase to an undesired temperature, or that the rate of increase of the temperature within the reactor does not exceed an undesired level. As another example, the undesired condition can be a partial or complete loss of reactor cooling in the system. When the undesired condition has reached a predetermined critical level (e.g., a temperature which is too high, a rate of increase in temperature which is too rapid, a complete loss of reactor cooling, etc.), the catalyst deactivating agent can be introduced into the polymerization reactor. As part of the operation of the polymerization reactor system, it can be pre-determined that, depending upon the nature of the undesired condition, the deactivating agent can be introduced within 30 minutes, within 15 minutes, within 10 minutes, within 5 minutes, within 1 minute, or within 30 seconds, after the undesired condition reaches the predetermined critical level. It is also contemplated that the deactivating agent can be added to the polymerization reactor instantaneously upon determining that the undesired condition has reached the predetermined critical level.

In the methods of controlling a polymerization reaction in a polymerization reactor system described herein, Applicants also contemplate that these methods can further comprise a step of discontinuing the introducing of the transition metal-based catalyst system into the polymerization reactor within the polymerization reactor system. The step of discontinuing the introducing of the transition metal-based catalyst system into the polymerization reactor can occur before, during, or after the step of introducing the catalyst deactivating agent into the polymerization reactor. For example, in some embodiments, it can be beneficial to discontinue the introducing of the transition metal-based catalyst system into the polymerization reactor concurrently with the step of introducing the catalyst deactivating agent into the polymerization reactor. Moreover, these methods can further comprise a step of restarting polymerization in the polymerization reactor by re-introducing the transition metal-based catalyst into the polymerization reactor. Depending upon the circumstances related to the reason for adding the catalyst deactivating agent (e.g., an emergency shutdown, a planned long term outage, a short outage, etc.), polymerization often can be restarted within from 5-15 minutes to 36-48 hours after the step of introducing the catalyst deactivating agent into the polymerization reactor. Polymerization can be restarted, in some embodiments, within 12 hours, within 8 hours, within 6 hours, within 2 hours, or within 1 hour, after the step of introducing the catalyst deactivating agent into the polymerization reactor.

Likewise, in the methods disclosed herein, Applicants contemplate that these methods can further comprise a step of discontinuing the introducing of the olefin monomer into the polymerization reactor. This step can occur before, during, or after the step of introducing the catalyst deactivating agent into the polymerization reactor. As with the discontinuing the introducing of the transition metal-based catalyst system, it can be beneficial in some embodiments to discontinue the introducing of the olefin monomer into the polymerization reactor concurrently with the step of introducing the catalyst deactivating agent into the polymerization reactor. Additionally, these methods can further comprise a step of restarting polymerization in the polymerization reactor by re-introducing the olefin monomer into the polymerization reactor. As above, depending upon the circumstances related to the reason for adding the catalyst deactivating agent, polymerization often can be restarted within from 10 minutes to 36 hours, for example, after the step of introducing the catalyst deactivating agent into the polymerization reactor. In an embodiment, polymerization can be restarted within 12 hours, within 8 hours, within 6 hours, within 2 hours, or within 1 hour, after the step of introducing the catalyst deactivating agent into the polymerization reactor.

In the methods disclosed herein, a step can comprise introducing a transition metal-based catalyst system, an olefin monomer, and optionally an olefin comonomer into the polymerization reactor. As would be recognized by one of skill in the art, additional components can be introduced into the polymerization reactor in addition to the transition metal-based catalyst system and the olefin monomer (and, olefin comonomer(s), if desired), and such unrecited components are encompassed herein. For instance, in the operation of a polymerization reactor system—depending, of course, on the polymerization reactor type, the desired olefin polymer, etc., among other factors—solvents and/or diluents and/or fluidizing gases, recycle streams, hydrogen, etc., also can be added or introduced into the polymerization reactor and polymerization reactor system.

While the methods disclosed herein can further comprise a step of discontinuing the introducing of the olefin monomer and/or the transition metal-based catalyst system into the polymerization reactor, other process steps can be conducted before, during, or after the step of introducing the catalyst deactivating agent into the polymerization reactor or reactor system. For example, reactor vents can be opened before, during, or after the step of introducing the catalyst deactivating agent into the polymerization reactor or reactor system. The flow of a reactor recycle stream can be discontinued before, during, or after the step of introducing the catalyst deactivating agent into the polymerization reactor or reactor system. However, in some embodiments, it can be advantageous to continue the flow of the reactor recycle stream after the step of introducing the catalyst deactivating agent into the polymerization reactor to improve the distribution of the catalyst deactivating agent throughout the polymerization reactor system. It is also contemplated that only the non-recycled olefin monomer flow can be discontinued before, during, or after the step of introducing the catalyst deactivating agent into the polymerization reactor.

In another method of controlling a polymerization reaction in a polymerization reactor system consistent with embodiments disclosed herein, the method can comprise:
(A) introducing a first transition metal-based catalyst system, a first olefin monomer, and optionally a first olefin comonomer into a polymerization reactor in the polymerization reactor system;
(B) contacting the first transition metal-based catalyst system with the first olefin monomer and the optional first olefin comonomer under polymerization conditions to produce a first olefin polymer;
(C) discontinuing the introducing of the first transition metal-based catalyst system into the polymerization reactor before, during, or after a step of introducing a catalyst deactivating agent into the polymerization reactor; and
(D) introducing a second transition metal-based catalyst system into the polymerization reactor and contacting the second transition metal-based catalyst system with a second olefin monomer and optionally a second olefin comonomer under polymerization conditions to produce a second olefin polymer.

This method of controlling a polymerization reaction in a polymerization reactor system can be directed to a method of transitioning from a first transition metal-based catalyst system to a second transition metal-based catalyst system in a polymerization reactor within the polymerization reactor system. In this method of controlling a polymerization reaction in a polymerization reactor system (e.g., transitioning from a first transition metal-based catalyst system to a second transition metal-based catalyst system), Applicants contemplate that the first transition metal-based catalyst system and the second transition metal-based catalyst system can be different catalyst systems (e.g., transitioning from a Ziegler-Natta based catalyst system to a metallocene-based catalyst system) or can be different catalyst systems of the same type (e.g., transitioning from a first metallocene-based catalyst system to a second metallocene-based catalyst system, transitioning from a first chromium-based catalyst system to a second chromium-based catalyst system, etc.). Additionally or alternatively, the first olefin polymer and the second olefin polymer can be different (e.g., transitioning from an ethylene homopolymer to an ethylene copolymer) or can be different grades of the same polymer type (e.g., transitioning from a first ethylene copolymer having a first melt index and a first density to a second ethylene copolymer having a second melt index and a second density). Likewise, the first olefin monomer and the second olefin monomer can be the same or different, and the first olefin comonomer (if used) and the second olefin comonomer (if used) can be the same or different. For instance, the first olefin monomer and the second olefin monomer can be the same, but no comonomer is used; alternatively, the first olefin monomer and the second olefin monomer can be different, but no comonomer is used; alternatively, the first olefin monomer and the second olefin monomer can be the same, and the first olefin comonomer and the second olefin comonomer can be the same or different; or alternatively, the first olefin monomer and the second olefin monomer can be the same, but no first olefin comonomer is used, and a second olefin comonomer is used. In circumstances where the second olefin monomer is different from the first olefin monomer and/or where the second olefin comonomer is different from the first olefin comonomer, the disclosed methods can further comprise a step of discontinuing the introducing of the first olefin monomer (and, if needed, discontinuing the introducing of the first olefin comonomer) into the polymerization reactor. This step can occur before, during, or after the step of introducing the catalyst deactivating agent into the polymerization reactor.

In each of the methods of controlling a polymerization reaction in a polymerization reactor system disclosed and described herein, the step of introducing the catalyst deactivating agent into the polymerization reactor (or into the polymerization reactor system downstream of the polymerization reactor) can reduce the catalyst activity of the transition metal-based catalyst system and/or can reduce the production rate of the olefin polymer by at least 50%. Applicants contemplate that there can be instances where the catalyst activity and/or production rate may need to be decreased by 50% or more (e.g., a partial kill where the reaction is not terminated, merely slowed down), as well as instances where a substantially complete or total termination of the polymerization reaction (95-100% decrease) may be needed. Hence, there are instances where the step of introducing the catalyst deactivating agent into the polymerization reactor (or into the polymerization reactor system downstream of the polymerization reactor) can reduce the catalyst activity of the transition metal-catalyst system and/or can reduce the production rate of the olefin polymer by at least 50%, while there are other instances where the step of introducing the catalyst deactivating agent into the polymerization reactor can reduce the catalyst activity of the transition metal-catalyst system and/or can reduce the production rate of the olefin polymer by at least 60%, by at least 70%, or by at least 80%. Furthermore, in certain embodiments, the step of introducing the catalyst deactivating agent into the polymerization reactor (or into the polymerization reactor system downstream of the polymerization reactor) can reduce the catalyst activity of the transition metal-catalyst system and/or can reduce the production rate of the olefin polymer by at least 85%; alternatively, by at least 90%; alternatively, by at least 95%; alternatively, by at least 98%; alternatively, by at least 99%, or alternatively, by 100%.

The step of introducing the catalyst deactivating agent into the polymerization reactor (or into the polymerization reactor system downstream of the polymerization reactor) can substantially reduce the catalyst activity of the transition metal-catalyst system and/or substantially reduce the production rate of the olefin polymer over a wide range of time periods, depending upon the desired circumstances, for example, in time periods ranging from as little as 1-30 seconds to as long as 1-2 hours. Often, however, the reduction in catalyst activity and/or production rate can be accomplished relatively rapidly. For instance, the step of introducing the catalyst deactivating agent into the polymerization reactor or reactor system can reduce the catalyst activity of the transition metal-catalyst system and/or can reduce the production rate of the olefin polymer by from 50% to 100% in a time period of less than 30 minutes, less than 15 minutes, less than 10 minutes, or less than 5 minutes, or less than one minute. In some embodiments, the step of introducing the catalyst deactivating agent into the polymerization reactor or reactor system can reduce the catalyst activity of the transition metal-catalyst system and/or reduce the production rate of the olefin polymer by at least 50%, by least 75%, by at least 85%, or by from 95-100%, in a time period of less than 5 minutes, less than 4 minutes, less than 3 minutes, or less than 2 minutes. In other embodiments, the catalyst activity of the transition metal-catalyst system and/or production rate of the olefin polymer can be reduced even more rapidly, such as, for example, a reduction of at least 50%, at least 75%, at least 85%, or by from 95-100%, etc., in less than 1 minute, in less than 45 seconds, or in less than 30 seconds. Further, the catalyst activity of the transition metal-catalyst system and/or production rate of the olefin polymer can be reduced by 95-100%, and this can occur instantaneously or substantially instantaneously. As one of skill in the art would recognize, the time period for reducing the catalyst activity and/or production rate can depend upon, for example, mass transfer limitations and/or residence time considerations within the polymerization reactor and polymerization reactor system.

In each of the methods of controlling a polymerization reaction in a polymerization reactor system disclosed and described herein, the catalyst deactivating agent can be introduced—into the polymerization reactor or into the polymerization reactor system downstream of the polymerization reactor—at a weight ratio of the catalyst deactivating agent to the transition metal in the transition metal-based catalyst system in a range from 0.001:1 to 1000:1, from 0.01:1 to 1000:1, from 0.01:1 to 500:1, from 0.1:1 to 1000:1, or from 0.1:1 to 500:1. The amount of catalyst deactivating agent employed can vary depending on, for example, the type of transition metal-based catalyst system, whether a co-catalyst is used, whether a partial or complete termination of the polymerization reaction is desired, the desired time period or rapidness for terminating the polymerization reaction, whether the polymerization reaction will be re-started shortly after termination, etc., among other factors. Suitable ranges for the weight ratio of the amount of the catalyst deactivating agent added to the reactor or reactor system based on the amount of the transition metal in the transition metal-based catalyst system present in the reactor or reactor system at the time of addition can include, but are not limited to, from 0.1:1 to 400:1, from 0.1:1 to 250:1, from 0.1:1 to 100:1, from 1:1 to 100:1, from 0.5:1 to 250:1, from 0.5:1 to 100:1, from 0.5:1 to 50:1, from 1:1 to 50:1, or from 1:1 to 25:1, and the like.

The catalyst deactivating agent can be introduced into the polymerization reactor, or into the polymerization reactor system downstream of the polymerization reactor, without a carrier or diluent. Alternatively, the catalyst deactivating agent can be introduced into the polymerization reactor, or into the polymerization reactor system downstream of the polymerization reactor, in the form of a mixture, suspension, solution, etc., along with a hydrocarbon solvent. For instance, the catalyst deactivating agent can be suspended or dissolved in a hydrocarbon solvent(s), and the catalyst deactivating agent and the respective hydrocarbon solvent(s) can be introduced together into the polymerization reactor or reactor system. Exemplary hydrocarbon solvents can comprise (or consist essentially of, or consist of) a $C_3$ to $C_{10}$ hydrocarbon; alternatively, a $C_3$ to $C_{10}$ aliphatic hydrocarbon; alternatively, a $C_3$ to $C_8$ aliphatic hydrocarbon; or alternatively, a $C_4$ to $C_8$ aliphatic hydrocarbon. The aliphatic hydrocarbon can be cyclic or acyclic and/or can be linear or branched, unless otherwise specified. Illustrative aliphatic hydrocarbon solvents can include, but are not limited to, propane, isobutane, n-butane, n-pentane, isopentane, neopentane, n-hexane, heptane, octane, cyclohexane, cycloheptane, methylcyclohexane, methylcycloheptane, and the like, including mixtures or combinations thereof.

Moreover, the hydrocarbon solvent can comprise (or consist essentially of, or consist of) a $C_6$ to $C_{10}$ aromatic hydrocarbon or, alternatively, a $C_6$ to $C_8$ aromatic hydrocarbon. Illustrative aromatic hydrocarbon solvents can include, but are not limited to, benzene, toluene, xylene, ethylbenzene, and the like, including mixtures or combinations thereof.

In an embodiment, the catalyst deactivating agent can be suspended or dissolved in a hydrocarbon solvent, and the hydrocarbon solvent can comprise (or consist essentially of, or consist of) propane, isobutane, n-butane, n-pentane, isopentane, neopentane, n-hexane, heptane, octane, cyclohexane, cycloheptane, methylcyclohexane, methylcycloheptane, benzene, toluene, xylene, ethylbenzene, and the like, or a mixture thereof. In another embodiment, the hydrocarbon solvent can comprise propane, cyclohexane, isobutane, n-butane, n-pentane, isopentane, neopentane, n-hexane, or a mixture thereof. In yet another embodiment, the hydrocarbon solvent can comprise propane; alternatively, isobutane; alternatively, n-butane; alternatively, n-pentane; alternatively, isopentane; alternatively, neopentane; alternatively, n-hexane; alternatively, heptane; alternatively, octane; alternatively, cyclohexane; alternatively, cycloheptane; alternatively, methylcyclohexane; alternatively, methylcycloheptane; alternatively, benzene; alternatively, toluene; alternatively, xylene; or alternatively, ethylbenzene. In still another embodiment, the hydrocarbon solvent can comprise an ISOPAR® mixed aliphatic hydrocarbon solvent, such as, for example, ISOPAR® C, ISOPAR® E, ISOPAR® G, ISOPAR® H, ISOPAR® L, ISOPAR® M, or a mixture thereof.

In the above methods, the step of introducing the catalyst deactivating agent into the polymerization reactor, or into the polymerization reactor system downstream of the polymerization reactor, can substantially reduce the catalyst activity of the transition metal-catalyst system and/or substantially reduce the production rate of the olefin polymer. Catalyst activity can be measured, for example, in units of grams of olefin polymer (ethylene homopolymer, ethylene copolymer, propylene homopolymer, etc., as the context requires) per gram of transition metal per hour (g/g-TM/hr), or in units of grams of olefin polymer per mole of transition metal per hour (g/mol-TM/hr). The production rate of the olefin polymer or the polymer output rate can be measured, for example, in the same units as that of catalyst activity, or in units of pounds of olefin polymer produced per hour (lb/hr). In embodiments directed to continuous polymerization reactor systems (e.g., slurry, gas phase, solution, and the like), the impact of the step of introducing the catalyst deactivating agent into the polymerization reactor or reactor system on the production rate of the olefin polymer may be easier to quantify than the impact on the catalyst activity.

Catalyst Deactivating Agents

Consistent with certain embodiments disclosed herein, the catalyst deactivating agent can comprise a natural source oil. Suitable natural source oils can include, but are not limited to, a tallow oil, an olive oil, a peanut oil, a castor bean oil, a sunflower oil, a sesame oil, a poppy seed oil, a palm oil, an almond seed oil, a hazelnut oil, a rapeseed oil, a canola oil, a soybean oil, a corn oil, a safflower oil, a cottonseed oil, a camelina oil, a flaxseed oil, a walnut oil, and the like, as well as any mixture of combination thereof. In one embodiment, the catalyst deactivating agent can comprise a natural source oil, and the natural source oil is or can comprise a tallow oil; alternatively, an olive oil; alternatively, a peanut oil; alternatively, a castor bean oil; alternatively, a sunflower oil; alternatively, a sesame oil; alternatively, a poppy seed oil; alternatively, a palm oil; alternatively, an almond seed oil; alternatively, a hazelnut oil; alternatively, a rapeseed oil; alternatively, a canola oil; alternatively, a soybean oil; alternatively, a corn oil; alternatively, a safflower oil; alternatively, a cottonseed oil; alternatively, a camelina oil; alternatively, a flaxseed oil; or alternatively, a walnut oil. In another embodiment, the catalyst deactivating agent can comprise a natural source oil, and the natural source oil can comprise a soybean oil, a corn oil, a canola oil, a castor bean oil, or a combination thereof. In yet another embodiment, the catalyst deactivating agent can comprise a natural source oil, and the natural source oil is or can comprise a corn oil.

Consistent with certain embodiments disclosed herein, the catalyst deactivating agent can comprise a siloxane. As a non-limiting example, for instance, the catalyst deactivating agent can comprise a siloxane, and the siloxane can have the following formula:

Generally, the selections of R and n in formula (I) are independently described herein, and these selections can be combined in any combination to further describe the siloxane catalyst deactivating agent having formula (I).

In an embodiment, each R independently can be a $C_1$ to $C_{18}$ hydrocarbyl group; alternatively, a $C_1$ to $C_{12}$ hydrocarbyl group; alternatively, a $C_1$ to $C_{10}$ hydrocarbyl group; alternatively, a $C_1$ to $C_8$ hydrocarbyl group; or alternatively, a $C_1$ to $C_5$ hydrocarbyl group. In another embodiment, each R independently can be a $C_1$ to $C_{18}$ alkyl group, a $C_2$ to $C_{18}$ alkenyl group, a $C_6$ to $C_{18}$ aryl group, or a $C_7$ to $C_{18}$ aralkyl group. For instance, each R independently can be a $C_1$ to $C_{12}$ alkyl group, a $C_2$ to $C_{12}$ alkenyl group, a $C_6$ to $C_{15}$ aryl group, or a $C_7$ to $C_{15}$ aralkyl group; alternatively, each R independently can be a $C_1$ to $C_{10}$ alkyl group, a $C_2$ to $C_{10}$ alkenyl group, a $C_6$ to $C_{12}$ aryl group, or a $C_7$ to $C_{12}$ aralkyl group; alternatively, each R independently can a $C_1$ to $C_8$ alkyl group, a $C_2$ to $C_8$ alkenyl group, a $C_6$ to $C_{10}$ aryl group, or a $C_7$ to $C_{10}$ aralkyl group; or alternatively, each R independently can be a $C_1$ to $C_5$ alkyl group, a $C_2$ to $C_5$ alkenyl group, a $C_6$ to $C_8$ aryl group, or a $C_7$ to $C_8$ aralkyl group. It is contemplated in these and other embodiments that each R can be the same, or that each R can be different.

Accordingly, in some embodiments, the alkyl group which can be R, independently, in formula (I) can be a methyl group, an ethyl group, a propyl group, a butyl group, a pentyl group, a hexyl group, a heptyl group, an octyl group, a nonyl group, a decyl group, a undecyl group, a dodecyl group, a tridecyl group, a tetradecyl group, a pentadecyl group, a hexadecyl group, a heptadecyl group, or an octadecyl group; or alternatively, a methyl group, an ethyl group, a propyl group, a butyl group, a pentyl group, a hexyl group, a heptyl group, an octyl group, a nonyl group, or a decyl group. In other embodiments, the alkyl group which can be R, independently, in formula (I) can be a methyl group, an ethyl group, a n-propyl group, an iso-propyl group, a n-butyl group, an iso-butyl group, a sec-butyl group, a tert-butyl group, a n-pentyl group, an iso-pentyl group, a sec-pentyl group, or a neopentyl group; alternatively, a methyl group, an ethyl group, an iso-propyl group, a n-butyl group, a tert-butyl group, or a neopentyl group; alternatively, a methyl group; alternatively, an ethyl group; alternatively, a n-propyl group; alternatively, an iso-propyl group; alternatively, a n-butyl group; alternatively, a tert-butyl group; or alternatively, a neopentyl group.

Illustrative alkenyl groups which can be R, independently, in formula (I) can include, but are not limited to, an ethenyl group, a propenyl group, a butenyl group, a pentenyl group, a hexenyl group, a heptenyl group, an octenyl group, a nonenyl group, a decenyl group, a undecenyl group, a dodecenyl group, a tridecenyl group, a tetradecenyl group, a pentadecenyl group, a hexadecenyl group, a heptadecenyl group, or an octadecenyl group. In one embodiment, each R in formula (I) independently can be an ethenyl group, a propenyl group, a butenyl group, a pentenyl group, a hexenyl group, a heptenyl group, an octenyl group, a nonenyl group, or a decenyl group, while in another embodiment, each R in formula (I) independently can be an ethenyl group, a propenyl group, a butenyl group, a pentenyl group, or a hexenyl group. For example, each R can be an ethenyl group; alternatively, a propenyl group; alternatively, a butenyl group; alternatively, a pentenyl group; or alternatively, a hexenyl group. In yet another embodiment, each R independently can be an acyclic terminal alkenyl group, such as a $C_3$ to $C_{10}$, or a $C_3$ to $C_8$, terminal alkenyl group.

In some embodiments, the aryl group which can be R, independently, in formula (I) can be a phenyl group, a substituted phenyl group, a naphthyl group, or a substituted naphthyl group. In an embodiment, the aryl group can be a phenyl group or a substituted phenyl group; alternatively, a naphthyl group or a substituted naphthyl group; alternatively, a phenyl group or a naphthyl group; or alternatively, a substituted phenyl group or a substituted naphthyl group. Substituents which can be utilized for the substituted phenyl group or substituted naphthyl group are independently disclosed herein and can be utilized without limitation to further describe the substituted phenyl group or substituted naphthyl group which can be utilized as R in formula (I).

In an embodiment, the substituted phenyl group which can be utilized as R, independently, can be a 2-substituted phenyl group, a 3-substituted phenyl group, a 4-substituted phenyl group, a 2,4-disubstituted phenyl group, a 2,6-disubstituted phenyl group, 3,5-disubstituted phenyl group, or a 2,4,6-trisubstituted phenyl group. In other embodiments, the substituted phenyl group can be a 2-substituted phenyl group, a 4-substituted phenyl group, a 2,4-disubstituted phenyl group, or a 2,6-disubstituted phenyl group; alternatively, a 3-substituted phenyl group or a 3,5-disubstituted phenyl group; alternatively, a 2-substituted phenyl group or a 4-substituted phenyl group; alternatively, a 2,4-disubstituted phenyl group or a 2,6-disubstituted phenyl group; alternatively, a 2-substituted phenyl group; alternatively, a 3-substituted phenyl group; alternatively, a 4-substituted phenyl group; alternatively, a 2,4-disubstituted phenyl group; alternatively, a 2,6-disubstituted phenyl group; alternatively, 3,5-disubstituted phenyl group; or alternatively, a 2,4,6-trisubstituted phenyl group. Substituents which can be utilized for these specific substituted phenyl groups are independently disclosed herein and can be utilized without limitation to further describe these substituted phenyl groups which can be utilized as the R group of formula (I).

In some embodiments, the aralkyl group which can be utilized as R in formula (I), independently, can be a benzyl group or a substituted benzyl group. Substituents which can be utilized for the substituted aralkyl group are independently disclosed herein and can be utilized without limitation to further describe the substituted aralkyl group which can be utilized as R in formula (I).

In an embodiment, each non-hydrogen substituent for the substituted aryl group or substituted aralkyl group which can be R in formula (I) independently can be a $C_1$ to $C_{10}$ hydrocarbyl group; alternatively, a $C_1$ to $C_8$ hydrocarbyl group; or alternatively, a $C_1$ to $C_5$ hydrocarbyl group. Specific substituent hydrocarbyl groups are independently disclosed herein and can be utilized without limitation to further describe the substituents of the substituted aryl group or substituted aralkyl group which can be R in formula (I). The number of substituents and their respective number of carbon atoms in any substituted aryl group or substituted aralkyl group is limited such that each R in formula (I) generally can have up to about 18 carbon atoms. Exemplary hydrocarbyl substituents can include, but are not limited to, an alkyl group, such as a methyl group, an ethyl group, a n-propyl group, an isopropyl group, a n-butyl group, a sec-butyl group, an isobutyl group, a tert-butyl group, a n-pentyl group, a 2-pentyl group, a 3-pentyl group, a 2-methyl-1-butyl group, a tert-pentyl group, a 3-methyl-1-butyl group, a 3-methyl-2-butyl group, or a neo-pentyl group, and the like, including combinations thereof.

In one embodiment, each R independently can be a $C_1$ to $C_{12}$ alkyl group, a $C_2$ to $C_{12}$ alkenyl group, a $C_6$ to $C_{15}$ aryl group, or a $C_7$ to $C_{15}$ aralkyl group; or alternatively, a $C_1$ to $C_{12}$ alkyl group, a $C_2$ to $C_{12}$ alkenyl group, a $C_6$ to $C_{15}$ aryl group, or a $C_7$ to $C_{15}$ aralkyl group. In another embodiment, each R independently can be a $C_1$ to $C_{12}$ alkyl group. In yet another embodiment, each R independently can be methyl, ethyl, propyl, butyl, pentyl, hexyl, heptyl, octyl, nonyl, decyl, phenyl, benzyl, or tolyl; alternatively, methyl, ethyl, propyl, butyl, pentyl, hexyl, heptyl, octyl, phenyl, benzyl, or tolyl; alternatively, methyl, ethyl, propyl, butyl, pentyl, hexyl, phenyl, benzyl, or tolyl; or alternatively, methyl, ethyl, propyl, butyl, or pentyl. In still another embodiment, each R can be the same and can be methyl, ethyl, propyl, butyl, pentyl, hexyl, heptyl, octyl, nonyl, decyl, phenyl, benzyl, or tolyl; alternatively, methyl, ethyl, propyl, butyl, pentyl, hexyl, heptyl, octyl, phenyl, benzyl, or tolyl; alternatively, methyl, ethyl, propyl, butyl, phenyl, or benzyl; alternatively, methyl, ethyl, propyl, or butyl; or alternatively, methyl.

The integer n in formula (I) can be greater than or equal to 2. In one embodiment, n can be an integer in a range from 2 to 900, or from 3 to 800, while in another embodiment, n can be an integer in a range from 3 to 500, or from 5 to 250.

The catalyst deactivating agent can comprise a siloxane, and in some embodiments, the siloxane can comprise hexamethyldisiloxane, octamethyltrisiloxane, tetramethyltetraphenyltrisiloxane, trimethylpentaphenyltrisiloxane, decamethyltetrasiloxane, octamethylcyclotetrasiloxane, decamethylcyclopentasiloxane, dodecamethylpentasiloxane, dodecamethylcyclohexasiloxane, a dimethyl-diphenylsiloxane, a phenylmethylsiloxane-dimethylsiloxane, a phenylmethylsiloxane, a polydimethylsiloxane, and the like, or any mixture or combination thereof. For example, the catalyst deactivating agent can comprise hexamethyldisiloxane; alternatively, octamethyltrisiloxane; alternatively, tetramethyltetraphenyltrisiloxane; alternatively, trimethylpentaphenyltrisiloxane; alternatively, decamethyltetrasiloxane; alternatively, octamethylcyclotetrasiloxane; alternatively, decamethylcyclopentasiloxane; alternatively, dodecamethylpentasiloxane; alternatively, dodecamethylcyclohexasiloxane; alternatively, a dimethyl-diphenylsiloxane; alternatively, a phenylmethylsiloxane-dimethylsiloxane; alternatively, a phenylmethylsiloxane; or alternatively, a polydimethylsiloxane.

Suitable siloxanes useful as catalyst deactivating agents can have a broad range of viscosities, typically less than 10,000 cSt at 25° C., or in a range from 1 to about 10,000 cSt at 25° C. In some embodiments, the siloxane can have a viscosity at 25° C. in a range from 2 to 5,000 cSt, from 2 to 2,500 cSt, from 2 to 1,000 cSt, or from 2 to 500 cSt. Yet, in other embodiments, the siloxane can have a viscosity at 25° C. in a range from 5 to 1,000 cSt, from 10 to 1,000 cSt, from 10 to 500 cSt, or from 20 to 350 cSt.

In accordance with an embodiment disclosed herein, the catalyst deactivating agent can have, beneficially, a boiling point of at least 80° C. at atmospheric pressure, such as, for example, a boiling point of at least 100° C., a boiling point of at least 120° C., or a boiling point of at least 150° C. Catalyst deactivating agents having boiling points of at least 175° C., or at least 200° C., can be employed as well. Yet, in another embodiment, the catalyst deactivating agent can have a boiling point in the 70° C. to 500° C. range; alternatively, a boiling point in the 80° C. to 450° C. range; alternatively, a boiling point in the 100° C. to 300° C. range; alternatively, a boiling point in the 120° C. to 375° C. range; alternatively, a boiling point in the 100° C. to 250° C. range; alternatively, a boiling point in the 100° C. to 350° C. range; alternatively, a boiling point in the 175° C. to 400° C. range; alternatively, a boiling point in the 175° C. to 300° C. range; or alternatively, a boiling point in the 150° C. to 450° C. range.

In another embodiment, it can be beneficial for the catalyst deactivating agent to remain in the liquid phase over a wide range of temperatures. For example, the catalyst deactivating agent can be a liquid throughout the temperature range of 20° C. to 80° C., or a liquid throughout the temperature range of −20° C. to 100° C. In other embodiments, the catalyst deactivating agent can be a liquid throughout the temperature range of 0° C. to 100° C., the temperature range of 20° C. to 120° C., the temperature range of 30° C. to 120° C., or the temperature range of 30° C. to 150° C.

The catalyst deactivating agent can be miscible with and/or soluble in a hydrocarbon solvent. For instance, the catalyst deactivating agent can be miscible with and/or soluble in a hydrocarbon solvent comprising (or consisting essentially of, or consisting of) a $C_3$ to $C_{10}$ hydrocarbon; alternatively, a $C_3$ to $C_{10}$ aliphatic hydrocarbon; alternatively, a $C_3$ to $C_8$ aliphatic hydrocarbon; or alternatively, a $C_4$ to $C_8$ aliphatic hydrocarbon. The aliphatic hydrocarbon can be cyclic or acyclic and/or can be linear or branched, unless otherwise specified. Illustrative aliphatic hydrocarbon solvents can include, but are not limited to, propane, isobutane, n-butane, n-pentane, isopentane, neopentane, n-hexane, heptane, octane, cyclohexane, cycloheptane, methylcyclohexane, methylcycloheptane, and the like, including mixtures or combinations thereof.

Furthermore, the catalyst deactivating agent can be miscible with and/or soluble in a hydrocarbon solvent comprising (or consisting essentially of, or consisting of) a $C_6$ to $C_{10}$ aromatic hydrocarbon or, alternatively, a $C_6$ to $C_8$ aromatic hydrocarbon. Illustrative aromatic hydrocarbon solvents can include, but are not limited to, benzene, toluene, xylene, ethylbenzene, and the like, including mixtures or combinations thereof.

In one embodiment, the catalyst deactivating agent can be miscible with and/or soluble in propane, isobutane, n-butane, n-pentane, isopentane, neopentane, n-hexane, heptane, octane, cyclohexane, cycloheptane, methylcyclohexane, methylcycloheptane, benzene, toluene, xylene, or ethylbenzene, or a mixture thereof. In another embodiment, the catalyst deactivating agent can be miscible with and/or soluble in propane, cyclohexane, isobutane, n-butane, n-pentane, isopentane, neopentane, or n-hexane, or a mixture thereof. In yet another embodiment, the catalyst deactivating agent can be miscible with and/or soluble in propane; alternatively, isobutane; alternatively, n-butane; alternatively, n-pentane; alternatively, isopentane; alternatively, neopentane; alternatively, n-hexane; alternatively, heptane; alternatively, octane; alternatively, cyclohexane; alternatively, cycloheptane; alternatively, methylcyclohexane; alternatively, methylcycloheptane; alternatively, benzene; alternatively, toluene; alternatively, xylene; or alternatively, ethylbenzene.

Applicants also contemplate that the catalyst deactivating agent can be miscible with and/or soluble in an ISOPAR® mixed aliphatic hydrocarbon solvent, such as, for example, ISOPAR® C, ISOPAR® E, ISOPAR® G, ISOPAR® H, ISOPAR® L, ISOPAR® M, or a mixture thereof.

Catalyst Systems

The methods disclosed herein are not limited to any particular transition-metal based catalyst system suitable for the polymerization of an olefin monomer. The transition-metal based catalyst system can comprise, for example, a transition metal (one or more than one) from Groups IIIB-VIIIB of the Periodic Table of the Elements. In one embodiment, the transition metal-based catalyst system can comprise a Group III, IV, V, or VI transition metal, or a combination of two or more transition metals. The transition metal-based catalyst system can comprise chromium, titanium, zirconium, hafnium, vanadium, or a combination thereof, or can comprise chromium, titanium, zirconium, hafnium, or a combination thereof, in other embodiments. Accordingly, the transition metal-based catalyst system can comprise chromium, or titanium, or zirconium, or hafnium, either singly or in combination.

Various transition metal-based catalyst systems known to a skilled artisan are useful in the polymerization of olefins. These include, but are not limited to, Ziegler-Natta based catalyst systems (e.g., Ziegler-based catalyst systems), chromium-based catalyst systems, metallocene-based catalyst systems, Phillips catalyst systems, Ballard catalyst systems, coordination compound catalyst systems, post-metallocene catalyst systems, and the like, including combinations thereof. The methods disclosed herein are not limited to the aforementioned catalyst systems, but Applicants nevertheless contemplate particular embodiments directed to these catalyst systems, as well as to dual catalyst or multi-catalyst combinations. For instance, the transition metal-based catalyst system can be a Ziegler-Natta based catalyst system, a chromium-based catalyst system, and/or a metallocene-based catalyst system; alternatively, a Ziegler-Natta based catalyst system; alternatively, a chromium-based catalyst system; or alternatively, a metallocene-based catalyst system. Examples of representative and non-limiting transition metal-based catalysts systems include those disclosed in the U.S. Pat. Nos. 3,887,494, 3,119,569, 4,053,436, 4,981,831, 4,364,842, 4,444,965, 4,364,855, 4,504,638, 4,364,854, 4,444,964, 4,444,962, 3,976,632, 4,248,735, 4,297,460, 4,397,766, 2,825,721, 3,225,023, 3,226,205, 3,622,521, 3,625,864, 3,900,457, 4,301,034, 4,547,557, 4,339,559, 4,806,513, 5,037,911, 5,219,817, 5,221,654, 4,081,407, 4,296,001, 4,392,990, 4,405,501, 4,151,122, 4,247,421, 4,460,756, 4,182,815, 4,735,931, 4,820,785, 4,988,657, 5,436,305, 5,610,247, 5,627,247, 3,242,099, 4,808,561, 5,275,992, 5,237,025, 5,244,990, 5,179,178, 4,855,271, 5,179,178, 5,275,992, 3,900,457, 4,939,217, 5,210,352, 5,436,305, 5,401,817, 5,631,335, 5,571,880, 5,191,132, 5,480,848, 5,399,636, 5,565,592, 5,347,026, 5,594,078, 5,498,581, 5,496,781, 5,563,284, 5,554,795, 5,420,320, 5,451,649, 5,541,272, 5,705,478, 5,631,203, 5,654,454, 5,705,579, 5,668,230, 6,300,271, 6,831,141, 6,653,416, 6,613,712, 7,294,599, 6,355,594, 6,395,666, 6,833,338, 7,417,097, 6,548,442, and 7,312,283, each of which is incorporated herein by reference in its entirety.

While not intending to be bound by theory, the catalyst deactivating agent may reduce the catalyst activity of the transition metal-catalyst system and/or reduce the production rate of the olefin polymer by neutralizing or interacting with the transition metal present in the transition metal-based catalyst system. In catalyst systems that contain a co-catalyst, the catalyst deactivating agent may additionally reduce the catalyst activity of the transition metal-catalyst system and/or reduce the production rate of the olefin polymer by neutralizing or interacting with the co-catalyst present in the transition metal-based catalyst system, although this is not a requirement.

Commonly used polymerization co-catalysts can include, but are not limited to, metal alkyl, or organometal, co-catalysts, with the metal encompassing boron, aluminum, and the like. For instance, alkyl boron and/or alkyl aluminum compounds often can be used as co-catalysts in a transition metal-based catalyst system. Representative compounds can include, but are not limited to, tri-n-butyl borane, tripropylborane, triethylborane, triethylaluminum, tri-isobutylaluminum, diethylaluminum chloride, and the like, including combinations thereof.

Olefin Monomers

Olefin monomers contemplated herein typically include olefin compounds having from 2 to 30 carbon atoms per molecule and having at least one olefinic double bond. Homopolymerization processes using a single olefin, such as ethylene, propylene, butene, hexene, octene, and the like, are encompassed, as well as copolymerization, terpolymerization, etc., reactions using an olefin monomer with at least one different olefinic compound. As previously disclosed, polymerization processes are meant to encompass oligomerization processes as well.

As an example, any resultant ethylene copolymers, terpolymers, etc., generally can contain a major amount of ethylene (>50 mole percent) and a minor amount of comonomer (<50 mole percent). Comonomers that can be copolymerized with ethylene often have from 3 to 20 carbon atoms in their molecular chain.

Acyclic, cyclic, polycyclic, terminal (u), internal, linear, branched, substituted, unsubstituted, functionalized, and non-functionalized olefins can be employed. For example, typical unsaturated compounds that can be polymerized to produce olefin polymers can include, but are not limited to, ethylene, propylene, 1-butene, 2-butene, 3-methyl-1-butene, isobutylene, 1-pentene, 2-pentene, 3-methyl-1-pentene, 4-methyl-1-pentene, 1-hexene, 2-hexene, 3-hexene, 3-ethyl-1-hexene, 1-heptene, 2-heptene, 3-heptene, the four normal octenes (e.g., 1-octene), the four normal nonenes, the five normal decenes, and the like, or mixtures of two or more of these compounds. Cyclic and bicyclic olefins, including but not limited to, cyclopentene, cyclohexene, norbornylene, norbornadiene, and the like, also can be polymerized as described herein. Styrene also can be employed as a monomer or as a comonomer. In an embodiment, the olefin monomer can be a $C_2$-$C_{20}$ olefin; alternatively, a $C_2$-$C_{12}$ olefin; alternatively, a $C_2$-$C_{10}$ α-olefin; alternatively, ethylene, propylene, 1-butene, 1-hexene, or 1-octene; alternatively, ethylene or propylene; alternatively, ethylene; or alternatively, propylene.

When a copolymer (or alternatively, a terpolymer) is desired, the olefin monomer can be, for example, ethylene or propylene, which is copolymerized with at least one comonomer. According to one embodiment, the olefin monomer in the polymerization process can be ethylene. In this embodiment, examples of suitable olefin comonomers can include, but are not limited to, propylene, 1-butene, 2-butene, 3-methyl-1-butene, isobutylene, 1-pentene, 2-pentene, 3-methyl-1-pentene, 4-methyl-1-pentene, 1-hexene, 2-hexene, 3-ethyl-1-hexene, 1-heptene, 2-heptene, 3-heptene, 1-octene, 1-decene, styrene, and the like, or combinations thereof. According to one embodiment, the comonomer can comprise an α-olefin, while in another embodiment, the comonomer can comprise 1-butene, 1-pentene, 1-hexene, 1-octene, 1-decene, styrene, or any combination thereof.

Generally, the amount of comonomer introduced into a polymerization reactor to produce the copolymer can be from about 0.01 to about 50 weight percent of the comonomer based on the total weight of the monomer and comonomer. According to another embodiment, the amount of comonomer introduced into a polymerization reactor can be from about 0.01 to about 40 weight percent comonomer based on the total weight of the monomer and comonomer. In still another embodiment, the amount of comonomer introduced into a polymerization reactor can be from about 0.1 to about 35 weight percent comonomer based on the total weight of the monomer and comonomer. Yet, in another embodiment, the amount of comonomer introduced into a polymerization reactor can be from about 0.5 to about 20 weight percent comonomer based on the total weight of the monomer and comonomer.

While not intending to be bound by this theory, where branched, substituted, or functionalized olefins are used as reactants, it is believed that a steric hindrance can impede and/or slow the polymerization reaction. Thus, branched and/or cyclic portion(s) of the olefin removed somewhat from the carbon-carbon double bond would not be expected to hinder the reaction in the way that the same olefin substituents situated more proximate to the carbon-carbon double bond might.

According to one embodiment, at least one monomer/reactant can be ethylene, so the polymerization reaction can be a homopolymerization involving only ethylene, or a copolymerization with a different acyclic, cyclic, terminal, internal, linear, branched, substituted, or unsubstituted olefin. In addition, the methods disclosed herein intend for olefin to also encompass diolefin compounds that include, but are not limited to, 1,3-butadiene, isoprene, 1,4-pentadiene, 1,5-hexadiene, and the like.

Olefin polymers encompassed herein can include any polymer (or oligomer) produced from any olefin monomer (and optional comonomer(s)) described herein. For example, the olefin polymer can comprise an ethylene homopolymer, a propylene homopolymer, an ethylene copolymer (e.g., ethylene/1-butene, ethylene/1-hexene, ethylene/1-octene, etc.), a propylene copolymer, an ethylene terpolymer, a propylene terpolymer, and the like, including combinations thereof.

Polymerization Reactor Systems

The disclosed methods are intended for any olefin polymerization process using various types of polymerization reactors, polymerization reactor systems, and polymerization reaction conditions. As used herein, "polymerization reactor" includes any polymerization reactor capable of polymerizing (inclusive of oligomerizing) olefin monomers and comonomers (one or more than one comonomer) to produce homopolymers, copolymers, terpolymers, and the like. The various types of polymerization reactors include those that can be referred to as a batch reactor, slurry reactor, gas-phase reactor, solution reactor, high pressure reactor, tubular reactor, autoclave reactor, and the like, or combinations thereof. The polymerization conditions for the various reactor types are well known to those of skill in the art. Gas phase reactors can comprise fluidized bed reactors or staged horizontal reactors. Slurry reactors can comprise vertical or horizontal loops. High pressure reactors can comprise autoclave or tubular reactors. Reactor types can include batch or continuous processes. Continuous processes could use intermittent or continuous product discharge. Polymerization reactor systems and processes also can include partial or full direct recycle of unreacted monomer, unreacted comonomer, and/or diluent.

A polymerization reactor system can comprise one type of reactor or multiple reactors of the same or different type. For instance, the polymerization reactor system can comprise a slurry reactor, a gas-phase reactor, a solution reactor, or a combination of two or more of these reactors. Production of polymers in multiple reactors can include several stages in at least two separate polymerization reactors interconnected by a transfer device making it possible to transfer the polymers resulting from the first polymerization reactor into the second reactor. The desired polymerization conditions in one of the reactors can be different from the operating conditions of the other reactor(s). Alternatively, polymerization in multiple reactors can include the manual transfer of polymer from one reactor to subsequent reactors for continued polymerization. Multiple reactor systems can include any combination including, but not limited to, multiple loop reactors, multiple gas phase reactors, a combination of loop and gas phase reactors, multiple high pressure reactors, or a combination of high pressure with loop and/or gas phase reactors. The multiple reactors can be operated in series, in parallel, or both.

According to one embodiment, the polymerization reactor system can comprise at least one loop slurry reactor comprising vertical or horizontal loops. Monomer, diluent, catalyst, and comonomer can be continuously fed to a loop reactor where polymerization occurs. Generally, continuous processes can comprise the continuous introduction of monomer/comonomer, a catalyst, and a diluent into a polymerization reactor and the continuous removal from this reactor of a suspension comprising polymer particles and the diluent. Reactor effluent can be flashed to remove the solid polymer from the liquids that comprise the diluent, monomer and/or comonomer. Various technologies can be used for this separation step including, but not limited to, flashing that can include any combination of heat addition and pressure reduction; separation by cyclonic action in either a cyclone or hydrocyclone; or separation by centrifugation.

A typical slurry polymerization process (also known as the particle form process) is disclosed, for example, in U.S. Pat. Nos. 3,248,179, 4,501,885, 5,565,175, 5,575,979, 6,239,235, 6,262,191, and 6,833,415, each of which is incorporated herein by reference in its entirety.

Suitable diluents used in slurry polymerization include, but are not limited to, the monomer being polymerized and hydrocarbons that are liquids under reaction conditions. Examples of suitable diluents include, but are not limited to, hydrocarbons such as propane, cyclohexane, isobutane, n-butane, n-pentane, isopentane, neopentane, and n-hexane. Some loop polymerization reactions can occur under bulk conditions where no diluent is used. An example is polymerization of propylene monomer as disclosed in U.S. Pat. No. 5,455,314, which is incorporated by reference herein in its entirety.

According to yet another embodiment, the polymerization reactor system can comprise at least one gas phase reactor (e.g., a fluidized bed reactor). Such reactor systems can employ a continuous recycle stream containing one or more monomers continuously cycled through a fluidized bed in the presence of the catalyst under polymerization conditions. A recycle stream can be withdrawn from the fluidized bed and recycled back into the reactor. Simultaneously, polymer product can be withdrawn from the reactor and new or fresh monomer can be added to replace the polymerized monomer. Such gas phase reactors can comprise a process for multi-step gas-phase polymerization of olefins, in which olefins are polymerized in the gaseous phase in at least two independent gas-phase polymerization zones while feeding a catalyst-containing polymer formed in a first polymerization zone to a second polymerization zone. One type of gas phase reactor is disclosed in U.S. Pat. Nos. 5,352,749, 4,588,790, and 5,436,304, each of which is incorporated by reference in its entirety herein.

According to still another embodiment, the polymerization reactor system can comprise a high pressure polymerization reactor, e.g., can comprise a tubular reactor or an autoclave reactor. Tubular reactors can have several zones where fresh monomer, initiators, or catalysts are added. Monomer can be entrained in an inert gaseous stream and introduced at one zone of the reactor. Initiators, catalysts, and/or catalyst components can be entrained in a gaseous stream and introduced at another zone of the reactor. The gas streams can be intermixed for polymerization. Heat and pressure can be employed appropriately to obtain optimal polymerization reaction conditions.

According to yet another embodiment, the polymerization reactor system can comprise a solution polymerization reactor wherein the monomer/comonomer are contacted with the catalyst composition by suitable stirring or other means. A carrier comprising an inert organic diluent or excess monomer can be employed. If desired, the monomer/comonomer can be brought in the vapor phase into contact with the catalytic reaction product, in the presence or absence of liquid material. The polymerization zone can be maintained at temperatures and pressures that will result in the formation of a solution of the polymer in a reaction medium. Agitation can be employed to obtain better temperature control and to maintain uniform polymerization mixtures throughout the polymerization zone. Adequate means are utilized for dissipating the exothermic heat of polymerization.

The polymerization reactor system can further comprise any combination of at least one raw material feed system, at least one feed system for catalyst or catalyst components, and/or at least one polymer recovery system. Suitable reactor systems can further comprise systems for feedstock purification, catalyst storage and preparation, extrusion, reactor cooling, polymer recovery, fractionation, recycle, storage, loadout, laboratory analysis, and process control. Depending upon the desired properties of the olefin polymer, hydrogen can be added to the polymerization reactor as needed (e.g., continuously, pulsed, etc.).

Polymerization conditions that are controlled for efficiency and to provide desired polymer properties can include temperature, pressure, and the concentrations of various reactants. Polymerization temperature can affect catalyst productivity, polymer molecular weight, and molecular weight distribution. A suitable polymerization temperature can be any temperature below the de-polymerization temperature according to the Gibbs Free energy equation. Typically, this includes from about 60° C. to about 280° C., for example, or from about 60° C. to about 110° C., depending upon the type of polymerization reactor. In some reactor systems, the polymerization temperature generally can be within a range from about 70° C. to about 90° C., or from about 75° C. to about 85° C.

Suitable pressures will also vary according to the reactor and polymerization type. The pressure for liquid phase polymerizations in a loop reactor typically can be less than 1000 psig. The pressure for gas phase polymerization can be in the 200 to 500 psig range. High pressure polymerization in tubular or autoclave reactors generally can be conducted at about 20,000 to 75,000 psig. Polymerization reactors also can be operated in a supercritical region occurring at generally higher temperatures and pressures. Operation above the critical point of a pressure/temperature diagram (supercritical phase) can offer advantages.

Compositions Containing a Catalyst Deactivating Agent

In accordance with certain embodiments, compositions containing a catalyst deactivating agent are provided, and such compositions can comprise (or consist essentially of, or consist of) a catalyst deactivating agent and a $C_3$ to $C_{18}$ hydrocarbon solvent. The catalyst deactivating agent can comprise a natural source oil, a siloxane, or a combination thereof, e.g., any natural source oil or siloxane described herein. In some embodiments, the composition can be a composition suitable for introduction or direct injection into a polymerization reactor system (e.g., for reducing catalyst activity and/or polymer production rate). As noted hereinabove, the catalyst deactivating agent can be introduced into the polymerization reactor, or into the polymerization reactor system downstream of the polymerization reactor, in a composition along with a $C_3$ to $C_{18}$ hydrocarbon solvent (e.g., a mixture, solution, suspension, etc.). The properties of the composition containing the catalyst deactivating agent and the $C_3$ to $C_{18}$ hydrocarbon solvent can be varied to ensure compatibility in the polymerization reactor system, as well as an overall composition viscosity that allows easy introduction into the reactor system and distribution throughout the reactor system.

Generally, the hydrocarbon solvent can comprise an aliphatic hydrocarbon, an aromatic hydrocarbon, or a combination thereof; alternatively, an aliphatic hydrocarbon; or alternatively, an aromatic hydrocarbon. Suitable aliphatic hydrocarbons which can be useful as the hydrocarbon solvent can include $C_3$ to $C_{18}$ aliphatic hydrocarbons; alternatively, $C_4$ to $C_{10}$ aliphatic hydrocarbons; or alternatively, $C_4$ to $C_8$ aliphatic hydrocarbons. The aliphatic hydrocarbons can be cyclic or acyclic and/or can be linear or branched, unless otherwise specified. Non-limiting examples of suitable acyclic aliphatic hydrocarbon solvents that can be utilized singly or in any combination can include propane, iso-butane, n-butane, butane (n-butane or a mixture of linear and branched $C_4$ acyclic aliphatic hydrocarbons), pentane (n-pentane or a mixture of linear and branched $C_5$ acyclic aliphatic hydrocarbons), hexane (n-hexane or mixture of linear and branched $C_6$ acyclic aliphatic hydrocarbons), heptane (n-heptane or mixture of linear and branched $C_7$ acyclic aliphatic hydrocarbons), octane (n-octane or a mixture of linear and branched $C_8$ acyclic aliphatic hydrocarbons), and the like, or combinations thereof; alternatively, iso-butane, n-butane, butane (n-butane or a mixture of linear and branched $C_4$ acyclic aliphatic hydrocarbons), pentane (n-pentane or a mixture of linear and branched $C_5$ acyclic aliphatic hydrocarbons), hexane (n-hexane or mixture of linear and branched $C_6$ acyclic aliphatic hydrocarbons), heptane (n-heptane or mixture of linear and branched $C_7$ acyclic aliphatic hydrocarbons), octane (n-octane or a mixture of linear and branched $C_8$ acyclic aliphatic hydrocarbons), or combinations thereof; alternatively, butane (n-butane or a mixture of linear and branched $C_4$ acyclic aliphatic hydrocarbons), pentane (n-pentane or a mixture of linear and branched $C_5$ acyclic aliphatic hydrocarbons), hexane (n-hexane or mixture of linear and branched $C_6$ acyclic aliphatic hydrocarbons), heptane (n-heptane or mixture of linear and branched $C_7$ acyclic aliphatic hydrocarbons), octane (n-octane or a mixture of linear and branched $C_8$ acyclic aliphatic hydrocarbons), or combinations thereof, alternatively, propane; alternatively, iso-butane; alternatively, n-butane; alternatively, butane (n-butane or a mixture of linear and branched $C_4$ acyclic aliphatic hydrocarbons); alternatively, pentane (n-pentane or a mixture of linear and branched $C_5$ acyclic aliphatic hydrocarbons); alternatively, hexane (n-hexane or mixture of linear and branched $C_6$ acyclic aliphatic hydrocarbons); alternatively, heptane (n-heptane or mixture of linear and branched $C_7$ acyclic aliphatic hydrocarbons); or alternatively, octane (n-octane or a mixture of linear and branched $C_8$ acyclic aliphatic hydrocarbons).

Non-limiting examples of suitable cyclic aliphatic hydrocarbon solvents can include, but are not limited to, cyclopentane, cyclohexane, methyl cyclopentane, methyl cyclohexane, and the like, or combinations thereof; alternatively, cyclopentane; alternatively, cyclohexane; alternatively, methyl cyclopentane; or alternatively, methyl cyclohexane. Aromatic hydrocarbons which can be useful as the hydrocarbon solvent can include $C_6$ to $C_{18}$ aromatic hydrocarbons or, alternatively, $C_6$ to $C_{10}$ aromatic hydrocarbons. Non-limiting examples of suitable aromatic hydrocarbons that can be utilized singly or in any combination can include, but are not limited to, benzene, toluene, xylene (including ortho-xylene, meta-xylene, para-xylene, or mixtures thereof), ethylbenzene, and the like, or combinations thereof; alternatively, benzene; alternatively, toluene; alternatively, xylene (including ortho-xylene, meta-xylene, para-xylene or mixtures thereof); or alternatively, ethylbenzene.

In one embodiment, the hydrocarbon solvent can comprise (or consist essentially of, or consist of) propane, isobutane, n-butane, n-pentane, isopentane, neopentane, n-hexane, n-heptane, n-octane, cyclopentane, cyclohexane, cycloheptane, methylcyclopentane, methylcyclohexane, methylcycloheptane, benzene, toluene, xylene, ethylbenzene, or a mixture thereof. In another embodiment, the hydrocarbon solvent can comprise propane, isobutane, n-butane, n-pentane, isopentane, neopentane, n-hexane, heptane, octane, cyclohexane, cycloheptane, methylcyclohexane, methylcycloheptane, benzene, toluene, xylene, ethylbenzene, or a mixture thereof. Yet, in another embodiment, the hydrocarbon solvent can comprise propane; alternatively, isobutane; alternatively, n-butane; alternatively, n-pentane; alternatively, isopentane; alternatively, neopentane; alternatively, n-hexane; alternatively, heptane; alternatively, octane; alternatively, cyclohexane; alternatively, cycloheptane; alternatively, methylcyclohexane; alternatively, methylcycloheptane; alternatively, benzene; alternatively, toluene; alternatively, xylene; or alternatively, ethylbenzene.

Certain compositions can comprise a catalyst deactivating agent and a $C_3$ to $C_{18}$ hydrocarbon solvent. Consistent with embodiments disclosed herein (and the particularities of the polymerization reaction system, the catalyst deactivating agent, the hydrocarbon solvent, etc.), the weight ratio of the hydrocarbon solvent to the catalyst deactivating agent in these compositions can be in a range from about 1000:1 to about 1:100, such as, for example, from about 750:1 to about 1:75, from about 500:1 to about 1:50, from about 250:1 to about 1:25, from about 100:1 to about 1:10, from about 50:1 to about 1:5, or from about 30:1 to about 1:3, and the like.

EXAMPLES

The invention is further illustrated by the following examples, which are not to be construed in any way as imposing limitations to the scope of this invention. Various other aspects, embodiments, modifications, and equivalents thereof which, after reading the description herein, can suggest themselves to one of ordinary skill in the art without departing from the spirit of the present invention or the scope of the appended claims.

Example 1

Addition of a Corn Oil Catalyst Deactivating Agent into a Polymerization Reaction Using a Chromium-Based Catalyst System.

The chromium-based catalyst system used in Example 1 was Magnapore 963, commercially available from W.R. Grace, and activated at approximately 870° C.

The polymerization run was conducted in a 2.2-L steel reactor equipped with a marine stirrer rotating at 500 rpm. The reactor was equipped with a temperature jacket and control system to maintain substantially constant temperature (+/−0.5° C.). A small amount of the solid chromium catalyst (0.144 g of the catalyst, which contained 1 wt. % Cr) was first charged under nitrogen to the dry reactor. Next, 1 L of isobutane liquid was charged, and the reactor heated up to 105° C. When co-catalysts were used, such as triethylaluminum (TEA), 1 mL of a 0.5 wt. % co-catalyst solution in heptane was added midway during the isobutane addition. Finally, ethylene was added to the reactor to a pressure of about 550 psig, which was maintained throughout the polymerization run. The reaction rate was determined by recording the flow of ethylene into the reactor required to maintain the fixed reactor pressure.

In Example 1, the corn oil catalyst deactivating agent was injected into the reactor during the run as follows. First, a corn oil solution was prepared by mixing 1 mL of corn oil, an edible grade available from Mazola, with 50 mL of n-heptane that was previously dried under 13× molecular sieve. After the polymerization was started, it was allowed to continue for about 18 min, long enough to reach peak activity. Then, 1 mL of the corn oil/n-heptane solution was added to the reactor as follows. The reactor first was closed so that the ethylene feed was stopped. Then, the pressure was decreased by bleeding off enough gas to lower the pressure to about 250 psig. Next, 1 mL of the corn oil/n-heptane solution was injected into an entry port which was simultaneously purged with isobutane vapor, then closed and re-filled with isobutane liquid. The port was re-pressurized with ethylene to 550 psig. The pressurized port was then opened to the reactor, so that the corn oil was immediately flushed with about 125 mL of isobutane into the reactor, followed by resuming ethylene addition at 550 psig.

The effect of the corn oil was immediately noticed by a drop in heat produced (as monitored by the difference in temperature between the jacket temperature and the reactor temperature), as well a rapid drop in the ethylene flow into the reactor. It usually took a few minutes to equalize the pressure between the reactor and the entry port, so that the ethylene flow continued for a few minutes, even though the polymerization reaction was terminated. Hence, the configuration of the reactor, and the method of injecting the corn oil into the reactor, resulted in continued ethylene flow for a few minutes, even after the reaction had been terminated. Applicants believe, based on the reaction data in FIG. 1 and the drop in heat production, that once the corn oil was in contact with the catalyst, the "kill" or termination of the reaction was extremely rapid, i.e., substantially instantaneous.

FIG. 1 graphically illustrates Example 1. The reaction rate listed, abbreviated gPE/g/h, was the grams of polyethylene produced per gram of the chromium catalyst system per hour. FIG. 1 demonstrates that a natural source oil, such as corn oil, can be very effective at reducing the catalyst activity and/or the reaction rate, as well as completely terminating a polymerization reaction. Additionally, very low amounts of the corn oil, based on the amount of the catalyst system (or the transition metal in the catalyst system), were required.

Example 2

Addition of a Corn Oil Catalyst Deactivating Agent into a Polymerization Reaction Using a Chromium-Based Catalyst System in Combination with a Triethylaluminum Co-Catalyst.

Example 2 was conducted in substantially the same manner as Example 1, except that 1 mL of 0.5 wt. % TEA co-catalyst solution was also added to the reactor, midway through the isobutane addition. About 0.077 grams of the same Magnapore catalyst was added to the reactor, followed by the other reactants, as described in Example 1. Then, about 17 min into the polymerization run, when the reaction rate had peaked, 1 mL of the same corn oil solution (in n-heptane) was injected into the reactor as the catalyst deactivating agent.

Figure 2:
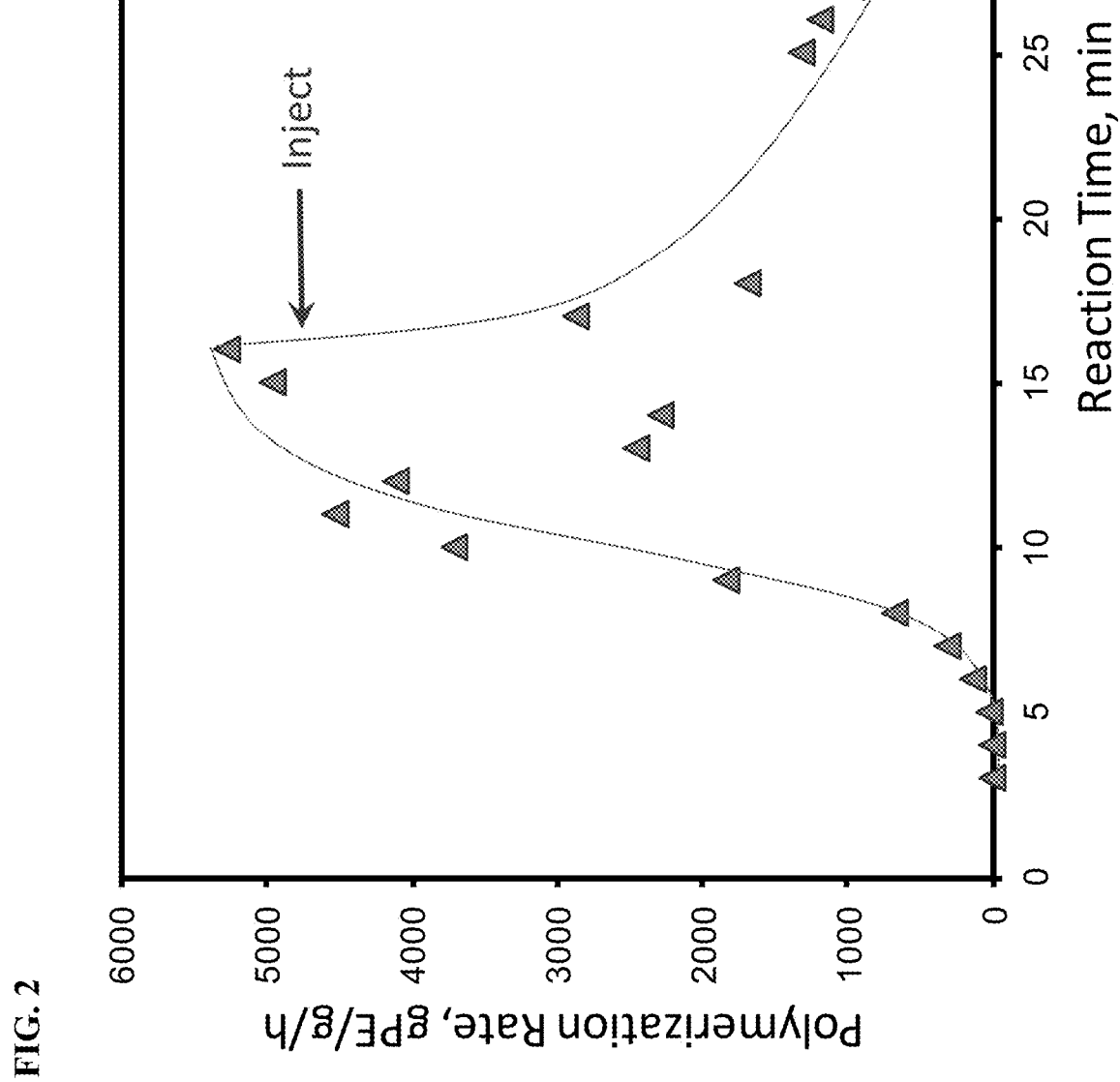
FIG. 2 presents a plot of the reaction rate versus the reaction time for Example 2 and the addition of corn oil to a polymerization reaction using a chromium-based catalyst system.

FIG. 2 graphically illustrates Example 2, with the reaction rate listed (gPE/g/h) being the grams of polyethylene produced per gram of the chromium catalyst system per hour. FIG. 2 demonstrates that a natural source oil, such as corn oil, can be very effective at reducing the catalyst activity and/or the reaction rate, even in the presence of a co-catalyst, as well as completely terminating a polymerization reaction. Additionally, very low amounts of the corn oil, based on the amount of the catalyst system (or the transition metal in the catalyst system), were required.

Example 3

Addition of a 100 cSt Polydimethylsiloxane Catalyst Deactivating Agent into a Polymerization Reaction Using a Chromium-Based Catalyst System in Combination with a Triethylaluminum Co-Catalyst.

Example 3 was conducted in the substantially the same manner as Example 1, except that a 100 cSt siloxane was injected into the reactor as the catalyst deactivating agent. Approximately 0.27 g of the same Magnapore catalyst described in Example 1 were charged into the reactor, and 1 mL of the 0.5 wt. % TEA solution was charged to the reactor midway between the isobutane addition. After about 7 min into the polymerization run, 1.8 mL of an n-heptane solution containing $2.116 \times 10^{-3}$ g of siloxane per mL were injected into the reactor. As soon as the siloxane was introduced into the reactor, there was an immediate and significant drop in the polymerization rate, as evidenced by the drop in the ethylene flow rate and in heat production. After about 10 min, the reaction rate was effectively zero.

Figure 3:
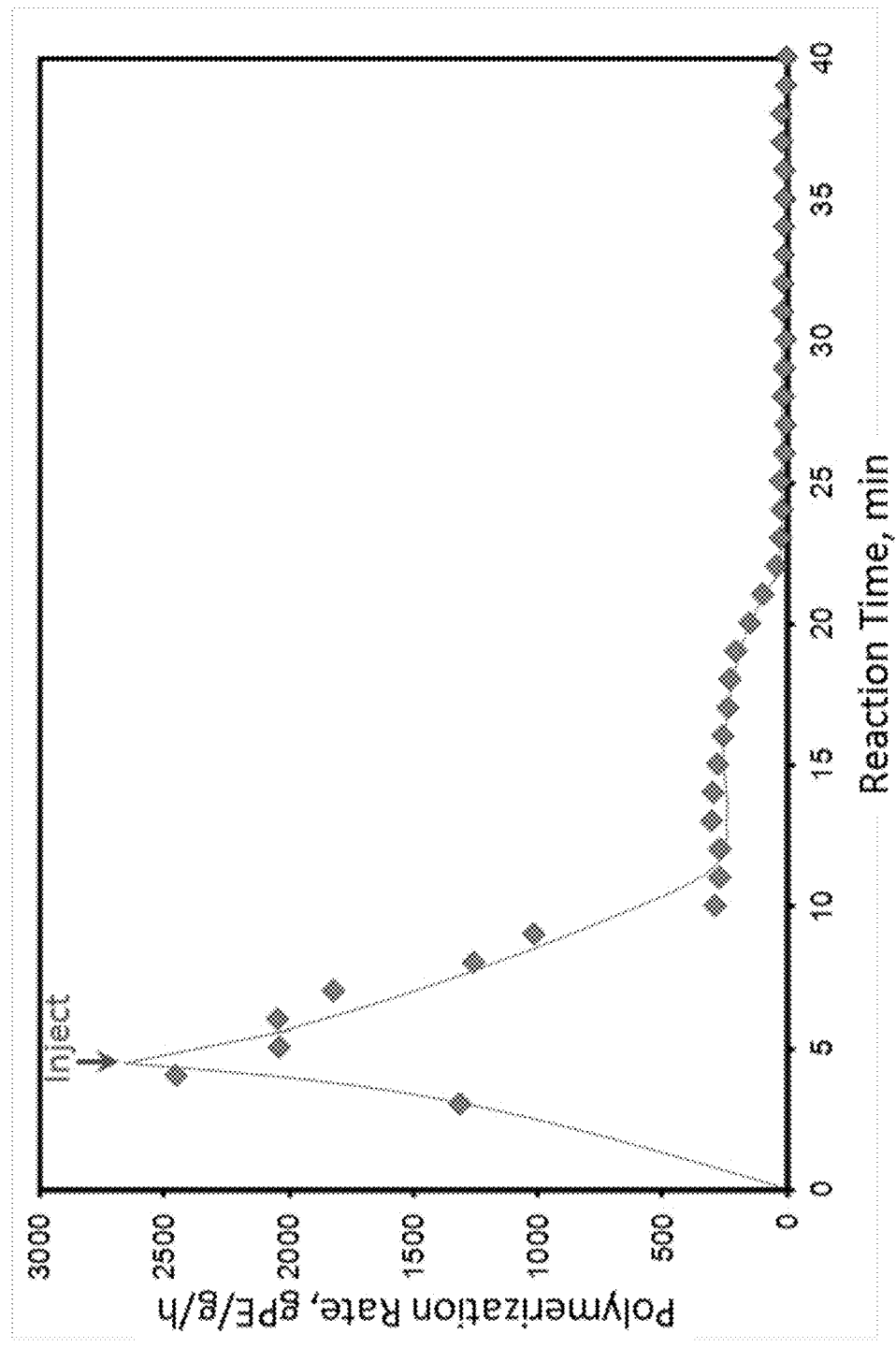
FIG. 3 presents a plot of the reaction rate versus the reaction time for Example 3 and the addition of a polydimethylsiloxane to a polymerization reaction using a chromium-based catalyst system.

FIG. 3 graphically illustrates Example 3, with the reaction rate listed (gPE/g/h) being the grams of polyethylene produced per gram of the chromium catalyst system per hour. FIG. 3 demonstrates that a siloxane, such as a polydimethylsiloxane with a viscosity of 100 cSt, can be very effective at reducing the catalyst activity and/or the reaction rate, as well as completely terminating a polymerization reaction. Additionally, very low amounts of the siloxane, based on the amount of the catalyst system, were required.

Constructive Examples 4-5

Constructive Addition of a Catalyst Deactivating Agent into a Polymerization Reaction Using a Ziegler-Natta Catalyst System.

The polymerizations of Constructive Examples 4-5 can be conducted in a 2.2-L reactor as described in Examples 1-3. The reactor can be prepared for use by purging with nitrogen and heating the empty reactor to 110° C. After cooling to below 40° C. and purging with isobutane vapor, 1 mL of 15 weight % TEA (triethylaluminum) in heptane, about 100 mg of a Ziegler-Natta catalyst (e.g., such as W.R. Grace 5951, but not limited thereto) which can contain 0.8 wt. % Ti, and 1.2 L of isobutane are added. The contents are mixed at 500 rpm and are heated to near the target polymerization temperature of 105° C., and can be maintained at that temperature for the duration of the run. Ethylene is then added and can be fed on demand to maintain the total pressure at 500 psig.

In Constructive Example 4, the catalyst deactivating agent is a soybean oil, while in Constructive Example 5, the catalyst deactivating agent is a polydimethylsiloxane having a viscosity at 25° C. of 250 cSt. The respective catalyst deactivating agent can be injected into the reactor midway through the run as follows. First, the reactor is closed so that the ethylene feed is stopped. Then, the pressure is decreased by bleeding off enough gas to lower the pressure to about 250 psig. Next, the catalyst deactivating agent, either neat or in a solution in n-heptane, is injected into an entry port which can be simultaneously purged with isobutane vapor, then closed and re-filled with isobutane liquid. The port is re-pressurized with ethylene to 500 psig. The pressurized port is then opened to the reactor, so that the catalyst deactivating agent is immediately flushed with about 125 mL of isobutane into the reactor, followed by resuming ethylene addition to 300 psig. In Constructive Example 4, the soybean oil is added at 0.2 g of soybean oil per g of the Ziegler-Natta catalyst. In Constructive Example 5, 0.2 g of the 250 cSt polydimethylsiloxane are added to produce a weight ratio of the siloxane to Ti in the Ziegler-Natta based catalyst system of 250.

The effect of the catalyst deactivating agent is immediately noticed by a drop in heat produced (as monitored by the difference in temperature between the jacket temperature and the reactor temperature). It usually may take a few minutes to equalize the pressure between the reactor and the entry port, so the ethylene flow can be continued for a few minutes. By monitoring the polymerization reaction rate over time, in grams of polyethylene produced per gram of the Ziegler-Natta catalyst system per hour, it is expected that the addition of the catalyst deactivating agent will rapidly inhibit the polymerization reaction, even at the very low addition levels.

Constructive Example 6

Constructive Addition of a Catalyst Deactivating Agent into a Polymerization Reaction Using a Metallocene-Based Catalyst System.

The polymerization of Constructive Example 6 can be conducted in a one-gallon (3.785-L) stainless steel reactor. Metallocene solutions (1 mg/mL) can be prepared by dissolving 30 mg of the metallocene in 30 mL of toluene. In Constructive Example 6, the catalyst deactivating agent is a canola oil. The catalyst deactivating agent can be injected neat, or in a solution prepared by dissolving the respective deactivating agent in an appropriate amount of heptanes.

A typical experimental procedure is as follows. Alkyl aluminum solution (0.5 mmol triisobutylaluminum), bromide-treated zinc/alumina (150 mg), and the metallocene solution (2 mg metallocene) are added in that order through a charge port while venting isobutane vapor. The aluminum to transition metal (Zr) ratio is approximately 146:1. The charge port is closed and about 1.8 L of isobutane are added. The contents of the reactor are stirred and heated to the desired run temperature of 90° C., which can be maintained constant via an automated heating-cooling system. Ethylene is continuously fed with an automated feeding system on demand to maintain the 390 psig pressure for the duration of the polymerization run. After the polymerization reaction is established, the catalyst deactivating agent is introduced into the reactor with high pressure ethylene injection. The metallocene compound used in this Constructive Example can have the following structure, but is not limited thereto:

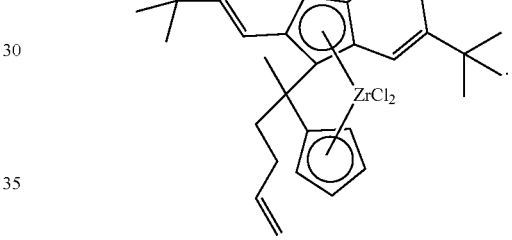

In Constructive Example 6, the canola oil is added at 0.25 grams of canola oil per gram of the metallocene compound. By monitoring the polymerization reaction rate over time, in kilograms of polyethylene produced per gram of the metallocene component of the catalyst system per hour, it is expected that the addition of the catalyst deactivating agent will rapidly terminate the polymerization reaction, even at the very low addition levels.

Examples 7-9

Reactor System Simulations Demonstrating that the Catalyst Deactivating Agent Remains with the Polymer Stream.

Simulation studies were conducted in loop slurry reactor systems to determine whether the catalyst deactivating agent will remain with the polymer stream exiting the reactor system. Three different plant systems were modeled, using either a high density polyethylene (HDPE) product or a linear low density polyethylene (LLDPE) product. Various weight ratios of polymer production rate to catalyst feed rate, of catalyst feed rate to deactivating agent feed rate, and of polymer production rate to isobutane (slurry diluent) recycle rate were simulated, as summarized in Table I. Reactor effluent leaving the reactor included, for example, polymer product, catalyst deactivating agent, isobutane diluent, ethylene, and 1-hexene (if used). In the simulation, the effluent entered a flash tank at a pressure of about 180-230 psig, and then entered a purge column at a pressure of around atmospheric pressure.

SIL-1 was a 45 cSt mixed phenylmethyl-dimethyl cyclosiloxane, SIL-2 was a 38 cSt tetramethyltetraphenyl-trisiloxane, and SIL-3 was a 175 cSt trimethylpentaphenyl-trisiloxane. For each of the simulations of Examples 7-9 and each of the respective catalyst deactivating agents, 100% of the catalyst deactivating agent remained with the polymer product stream after passing through the flash tank and purge column, and 0% was present in the isobutane recycle stream.

TABLE I

Examples 7-9.

| Example | Plant | Product | Catalyst Deactivating Agent | Ratio of Production Rate to Catalyst Feed Rate | Ratio of Catalyst Feed Rate to Deactivating Agent Feed Rate | Ratio of Production Rate to Isobutane Recycle Rate |
|---|---|---|---|---|---|---|
| 7 | A | HDPE | SIL-1, 2 or 3 | 1940:1 | 3.8:1 | 1.2:1 |
| 8 | B | LLDPE | SIL-1, 2 or 3 | 2250:1 | 3.8:1 | 0.9:1 |
| 9 | C | HDPE | SIL-1, 2 or 3 | 4420:1 | 3.8:1 | 1.1:1 |

The invention has been described above with reference to numerous embodiments and specific examples. Many variations will suggest themselves to those skilled in the art in light of the above detailed description. All such obvious variations are within the full intended scope of the appended claims. Other embodiments of the invention can include, but are not limited to, the following:

Embodiment 1

A method of controlling a polymerization reaction in a polymerization reactor system, the method comprising:
(i) introducing a transition metal-based catalyst system, an olefin monomer, and optionally an olefin comonomer into a polymerization reactor within the polymerization reactor system;
(ii) contacting the transition metal-based catalyst system with the olefin monomer and the optional olefin comonomer under polymerization conditions to produce an olefin polymer; and
(iii) introducing a catalyst deactivating agent into the polymerization reactor system to partially or completely terminate the polymerization reaction in the polymerization reactor system;
wherein the catalyst deactivating agent comprises a natural source oil, a siloxane, or a combination thereof.

Embodiment 2

The method defined in embodiment 1, wherein the catalyst deactivating agent is introduced into the polymerization reactor to partially or completely terminate the polymerization reaction in the polymerization reactor.

Embodiment 3

The method defined in embodiment 1, wherein the catalyst deactivating agent is introduced into the polymerization reactor system downstream of the polymerization reactor to completely terminate the polymerization reaction.

Embodiment 4

The method defined in embodiment 1, wherein a process variable is monitored to detect an undesired condition in the polymerization reactor system, and when the undesired reaction condition has reached a predetermined critical level, the catalyst deactivating agent is introduced into the polymerization reactor.

Embodiment 5

The method defined in any one of the preceding embodiments, the method further comprising:
a step of discontinuing the introducing of the transition metal-based catalyst system into the polymerization reactor before, during, or after the step of introducing the catalyst deactivating agent into the polymerization reactor or polymerization reactor system;
a step of discontinuing the introducing of the olefin monomer into the polymerization reactor before, during, or after the step of introducing the catalyst deactivating agent into the polymerization reactor or polymerization reactor system; or both.

Embodiment 6

The method defined in embodiment 1, wherein:
Step (i) comprises:
(A) introducing a first transition metal-based catalyst system, a first olefin monomer, and optionally a first olefin comonomer into a polymerization reactor in the polymerization reactor system;
Step (ii) comprises:
(B) contacting the first transition metal-based catalyst system with the first olefin monomer and the optional first olefin comonomer under polymerization conditions to produce a first olefin polymer; the method further comprising:
(C) discontinuing the introducing of the first transition metal-based catalyst system into the polymerization reactor before, during, or after step (iii) of introducing the catalyst deactivating agent into the polymerization reactor; and
(D) introducing a second transition metal-based catalyst system into the polymerization reactor and contacting the second transition metal-based catalyst system with a second olefin monomer and optionally a second olefin comonomer under polymerization conditions to produce a second olefin polymer.

Embodiment 7

The method defined in any one of the preceding embodiments, wherein the transition metal-based catalyst system comprises any transition metal disclosed herein, for example, chromium, vanadium, titanium, zirconium, hafnium, or a combination thereof.

Embodiment 8

The method defined in any one of the preceding embodiments, wherein the transition metal-based catalyst system is any transition metal-based catalyst system disclosed herein, for example, a chromium-based catalyst system, a Ziegler-Natta based catalyst system, a metallocene-based catalyst system, and the like, or a combination thereof.

Embodiment 9

The method defined in any one of the preceding embodiments, wherein the olefin monomer is any olefin monomer disclosed herein, for example, a $C_2$-$C_{20}$ olefin, ethylene, propylene, etc.

Embodiment 10

The method defined in any one of the preceding embodiments, wherein the olefin monomer is ethylene.

Embodiment 11

The method defined in any one of the preceding embodiments, wherein the olefin monomer is ethylene and the olefin comonomer comprises any olefin comonomer disclosed herein, for example, propylene, 1-butene, 2-butene, 3-methyl-1-butene, isobutylene, 1-pentene, 2-pentene, 3-methyl-1-pentene, 4-methyl-1-pentene, 1-hexene, 2-hexene, 3-ethyl-1-hexene, 1-heptene, 2-heptene, 3-heptene, 1-octene, 1-decene, styrene, or a mixture thereof.

Embodiment 12

The method defined in any one of the preceding embodiments, wherein the olefin monomer is ethylene and the olefin comonomer comprises 1-butene, 1-hexene, 1-octene, or a mixture thereof.

Embodiment 13

The method defined in any one of the preceding embodiments, wherein the polymerization reactor system comprises any reactor type disclosed herein, for example, a slurry reactor, a gas-phase reactor, a solution reactor, or a combination thereof.

Embodiment 14

The method defined in any one of the preceding embodiments, wherein the polymerization reactor system comprises two or more reactors.

Embodiment 15

The method defined in any one of the preceding embodiments, wherein the catalyst deactivating agent is introduced into the polymerization reactor or polymerization reactor system at an amount in any range of weight ratios of the catalyst deactivating agent to the transition metal in the transition metal-based catalyst system disclosed herein, for example, in a range from 0.001:1 to 1000:1, from 0.01:1 to 1000:1, from 0:1:1 to 500:1, from 1:1 to 100:1, etc.

Embodiment 16

The method defined in any one of the preceding embodiments, wherein the step of introducing the catalyst deactivating agent into the polymerization reactor or polymerization reactor system reduces the catalyst activity of the transition metal-catalyst system by any percentage amount disclosed herein, for example, at least 50%, at least 90%, etc.

Embodiment 17

The method defined in any one of the preceding embodiments, wherein the step of introducing the catalyst deactivating agent into the polymerization reactor or polymerization reactor system reduces the production rate of the olefin polymer by any percentage amount disclosed herein, for example, at least 50%, at least 90%, etc.

Embodiment 18

The method defined in any one of the preceding embodiments, wherein the step of introducing the catalyst deactivating agent into the polymerization reactor or polymerization reactor system reduces the catalyst activity of the transition metal-catalyst system by any percentage amount disclosed herein in any maximum time period disclosed herein, for example, reducing the catalyst activity by at least 95% in a time period of less than 1 minute.

Embodiment 19

The method defined in any one of the preceding embodiments, wherein the step of introducing the catalyst deactivating agent into the polymerization reactor or polymerization reactor system reduces the production rate of the olefin polymer by any percentage amount disclosed herein in any maximum time period disclosed herein, for example, reducing the production rate by at least 95% in a time period of less than 1 minute.

Embodiment 20

A composition comprising:
a hydrocarbon solvent having from 3 to 18 carbon atoms; and
a catalyst deactivating agent comprising a natural source oil, a siloxane, or a combination thereof.

Embodiment 21

The composition defined in embodiment 20, wherein the hydrocarbon solvent comprises any hydrocarbon solvent having from 3 to 18 carbon atoms disclosed herein, for example, propane, isobutane, n-butane, n-pentane, isopentane, neopentane, n-hexane, heptane, octane, cyclohexane, cycloheptane, methylcyclohexane, methylcycloheptane, benzene, toluene, xylene, ethylbenzene, or a mixture thereof.

Embodiment 22

The composition defined in embodiment 20 or 21, wherein the weight ratio of the hydrocarbon solvent to the catalyst deactivating agent in the composition is any range of weight ratios disclosed herein, for example, from about 1000:1 to about 1:100, or from about 500:1 to about 1:50.

Embodiment 23

The method or composition defined in any one of the preceding embodiments, wherein the catalyst deactivating agent has a boiling point greater than any minimum boiling point temperature or in any boiling point range disclosed herein, for example, a boiling point of at least 100° C., or a boiling point of at least 120° C.

Embodiment 24

The method or composition defined in any one of the preceding embodiments, wherein the catalyst deactivating agent is miscible with any $C_3$ to $C_{10}$ hydrocarbon solvent disclosed herein.

Embodiment 25

The method or composition defined in any one of the preceding embodiments, wherein the catalyst deactivating agent is miscible with propane, cyclohexane, isobutane, n-butane, n-pentane, isopentane, neopentane, n-hexane, or benzene, or a mixture thereof.

Embodiment 26

The method or composition defined in any one of the preceding embodiments, wherein the catalyst deactivating agent is soluble in any $C_3$ to $C_{10}$ hydrocarbon solvent disclosed herein.

Embodiment 27

The method or composition defined in any one of the preceding embodiments, wherein the catalyst deactivating agent is soluble in propane, cyclohexane, isobutane, n-butane, n-pentane, isopentane, neopentane, n-hexane, or benzene, or a mixture thereof.

Embodiment 28

The method or composition defined in any one of the preceding embodiments, wherein the catalyst deactivating agent is a liquid throughout any range of temperatures disclosed herein, for example, a liquid throughout the temperature range of 20° C. to 80° C., or a liquid throughout the temperature range of −20° C. to 100° C.

Embodiment 29

The method or composition defined in any one of the preceding embodiments, wherein the catalyst deactivating agent comprises a natural source oil.

Embodiment 30

The method or composition defined in any one of the preceding embodiments, wherein the catalyst deactivating agent comprises a natural source oil, and wherein the natural source oil comprises a tallow oil, an olive oil, a peanut oil, a castor bean oil, a sunflower oil, a sesame oil, a poppy seed oil, a palm oil, an almond seed oil, a hazelnut oil, a rapeseed oil, a canola oil, a soybean oil, a corn oil, a safflower oil, a cottonseed oil, a camelina oil, a flaxseed oil, a walnut oil, or any combination thereof.

Embodiment 31

The method or composition defined in any one of the preceding embodiments, wherein the catalyst deactivating agent comprises a natural source oil, and wherein the natural source oil comprises a soybean oil, a corn oil, a canola oil, a castor bean oil, or a combination thereof.

Embodiment 32

The method or composition defined in any one of the preceding embodiments, wherein the catalyst deactivating agent comprises a natural source oil, and wherein the natural source oil is a corn oil.

Embodiment 33

The method or composition defined in any one of embodiments 1-28, wherein the catalyst deactivating agent comprises a siloxane.

Embodiment 34

The method or composition defined in any one of embodiments 1-28, wherein the catalyst deactivating agent comprises a siloxane, and wherein the siloxane has the formula:

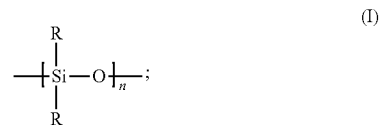

wherein:
each R independently is a $C_1$ to $C_{18}$ hydrocarbyl group; and
n is an integer greater than or equal to 2.

Embodiment 35

The method or composition defined in embodiment 34, wherein each R independently is a $C_1$ to $C_8$ alkyl group, a $C_2$ to $C_8$ alkenyl group, a $C_6$ to $C_{10}$ aryl group, or a $C_7$ to $C_{10}$ aralkyl group.

Embodiment 36

The method or composition defined in embodiment 34, wherein each R independently is methyl, ethyl, propyl, butyl, phenyl, or benzyl.

Embodiment 37

The method or composition defined in embodiment 34, wherein each R is methyl.

Embodiment 38

The method or composition defined in any one of embodiments 34-37, wherein n is an integer in any range of integers disclosed herein, for example, from 2 to 900, from 3 to 500, or from 5 to 250.

Embodiment 39

The method or composition defined in any one of embodiments 33-38, wherein the siloxane has a viscosity less than any maximum viscosity or in any range of viscosities disclosed herein, for example, less than 10,000 cSt at 25° C., in a range from 2 to 5,000 cSt at 25° C., or in a range from 2 to 500 cSt at 25° C.

Embodiment 40

The method or composition defined in any one of embodiments 33-39, wherein the siloxane is any siloxane material disclosed herein, for example, hexamethyldisiloxane, octamethyltrisiloxane, tetramethyltetraphenyltrisiloxane, trimethylpentaphenyltrisiloxane, decamethyltetrasiloxane, octamethylcyclotetrasiloxane, decamethylcyclopentasiloxane, dodecamethylpentasiloxane, dodecamethylcyclohexasiloxane, a dimethyl-diphenylsiloxane, a phenylmethylsiloxane-dimethylsiloxane, a phenylmethylsiloxane, a polydimethylsiloxane, and the like, or any combination thereof.

Embodiment 41

The method or composition defined in any one of embodiments 33-40, wherein the siloxane is a polydimethylsiloxane.

We claim:

1. A composition for use in an olefin polymerization reactor system, the composition consisting of:
   isobutane; and
   a catalyst deactivating agent that is a natural source oil, a siloxane, or a combination thereof.

2. The composition of claim 1, wherein:
   the catalyst deactivating agent is a natural source oil; and
   the natural source oil is a tallow oil, an olive oil, a peanut oil, a castor bean oil, a sunflower oil, a sesame oil, a poppy seed oil, a palm oil, an almond seed oil, a hazelnut oil, a rapeseed oil, a canola oil, a soybean oil, a corn oil, a safflower oil, a cottonseed oil, a camelina oil, a flaxseed oil, a walnut oil, or any combination thereof.

3. The composition of claim 1, wherein:
   the catalyst deactivating agent is a natural source oil; and
   the natural source oil is a soybean oil, a corn oil, a canola oil, a castor bean oil, or any combination thereof.

4. The composition of claim 1, wherein:
   the catalyst deactivating agent is a natural source oil; and
   the natural source oil is a corn oil.

5. The composition of claim 1, wherein:
   the catalyst deactivating agent is a siloxane; and
   the siloxane has the formula:

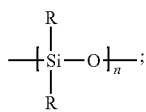

(I)

wherein:
   each R independently is a $C_1$ to $C_{18}$ hydrocarbyl group; and
   n is an integer greater than or equal to 2.

6. The composition of claim 5, wherein:
   each R independently is methyl, ethyl, propyl, butyl, phenyl, or benzyl; and
   the siloxane has a viscosity in a range from 2 to 2,500 cSt at 25° C.

7. The composition of claim 1, wherein:
   the catalyst deactivating agent is a siloxane; and
   the siloxane is a polydimethylsiloxane.

8. The composition of claim 7, wherein the polydimethylsiloxane has a viscosity in a range from 2 to 1,000 cSt at 25° C.

9. The composition of claim 1, wherein the catalyst deactivating agent:
   has a boiling point of at least 100° C.;
   is miscible with a $C_3$ to $C_{10}$ hydrocarbon solvent; and
   is a liquid throughout a temperature range of 20° C. to 80° C.

10. The composition of claim 1, wherein the catalyst deactivating agent:
    has a boiling point of at least 120° C.;
    is miscible with isobutane; and
    is a liquid throughout a temperature range of −20° C. to 100° C.

11. The composition of claim 1, wherein a weight ratio of isobutane to the catalyst deactivating agent is in a range from about 1000:1 to about 1:100.

12. The composition of claim 1, wherein a weight ratio of isobutane to the catalyst deactivating agent is in a range from about 100:1 to about 1:10.

13. A composition for use in an olefin polymerization reactor system, the composition consisting of:
    an alkane solvent comprising propane, isobutane, n-butane, n-pentane, isopentane, neopentane, n-hexane, heptane, octane, cyclohexane, cycloheptane, methylcyclohexane, methylcycloheptane, or a mixture thereof; and
    a catalyst deactivating agent comprising a siloxane characterized by a viscosity in a range from 2 to 5,000 cSt at 25° C.

14. The composition of claim 13, wherein the siloxane comprises a polydimethylsiloxane.

15. The composition of claim 13, wherein the viscosity is in a range from 2 to 500 cSt at 25° C.

16. The composition of claim 13, wherein a weight ratio of the alkane solvent to the siloxane is in a range from about 100:1 to about 1:10.

17. The composition of claim 1, wherein:
    the catalyst deactivating agent comprises the natural source oil; and
    the natural source oil comprises a soybean oil.

18. The composition of claim 13, wherein the alkane solvent comprises n-pentane, isopentane, neopentane, or a mixture thereof.

19. The composition of claim 13, wherein the alkane solvent comprises n-hexane, heptane, octane, or a mixture thereof.

20. The composition of claim 13, wherein the alkane solvent comprises cyclohexane, cycloheptane, methylcyclohexane, methylcycloheptane, or a mixture thereof.

21. A composition for use in an olefin polymerization reactor system, the composition consisting of:
    an alkane solvent having from 3 to 18 carbon atoms; and
    a catalyst deactivating agent comprising a polydimethylsiloxane characterized by a viscosity in a range from 2 to 5,000 cSt at 25° C.

22. The composition of claim 21, wherein the viscosity is in a range from 2 to 500 cSt at 25° C.

23. The composition of claim 21, wherein a weight ratio of the alkane solvent to the polydimethylsiloxane is in a range from about 100:1 to about 1:10.

* * * * *